United States Patent
Gheorghiu et al.

(10) Patent No.: US 11,246,107 B2
(45) Date of Patent: Feb. 8, 2022

(54) THROUGHPUT MODIFICATION FOR TIME DELAYED CARRIERS

(71) Applicant: QUALCOMM Incorporated, San Diego, CA (US)

(72) Inventors: Valentin Alexandru Gheorghiu, Tokyo (JP); Hari Sankar, San Diego, CA (US); Gaurav Nigam, Jersey City, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/671,007

(22) Filed: Oct. 31, 2019

(65) Prior Publication Data

US 2020/0145947 A1    May 7, 2020

Related U.S. Application Data

(60) Provisional application No. 62/755,269, filed on Nov. 2, 2018.

(51) Int. Cl.
*H04W 56/00* (2009.01)
*H04W 24/10* (2009.01)
(Continued)

(52) U.S. Cl.
CPC ...... *H04W 56/0005* (2013.01); *H04B 7/0632* (2013.01); *H04B 17/336* (2015.01);
(Continued)

(58) Field of Classification Search
CPC ............... H04B 17/309; H04B 17/336; H04B 7/0632; H04L 1/0003; H04L 1/0026;
(Continued)

(56) References Cited

U.S. PATENT DOCUMENTS

2006/0034407 A1\* 2/2006 Dick .................... H04B 7/2687
375/356
2009/0253451 A1\* 10/2009 Trachewsky ............ H04W 4/14
455/509
(Continued)

FOREIGN PATENT DOCUMENTS

WO    WO-2019074854 A1    4/2019

OTHER PUBLICATIONS

International Search Report and Written Opinion—PCT/US2019/059408—ISA/EPO—dated Feb. 6, 2020.
2010/0265968
A1
\*
10/2010
Baldemair .............................................................. H04L 27/2678
370/503
(Continued)

*Primary Examiner* — Robert J Lopata
(74) *Attorney, Agent, or Firm* — Holland & Hart LLP; Timothy R. Hirzel

(57) ABSTRACT

Methods, systems, and devices for wireless communications are described. A user equipment (UE) may identify a set of carriers configured for communications between the UE and one or more transmission reception points (e.g., a set of transmission points). The UE may receive multiple communications over different carriers and determine a time difference or delay between two of the carriers (e.g., a first carrier and a second carrier). Based on the time difference and a time difference threshold, the UE may perform a throughput degradation procedure such as transmitting a report indicating the time difference, transmitting a feedback report with channel quality information determined based on the time difference, etc.

27 Claims, 19 Drawing Sheets

(51) Int. Cl.

| | | |
|---|---|---|
| *H04L 12/26* | (2006.01) | |
| *H04B 7/06* | (2006.01) | |
| *H04W 72/04* | (2009.01) | |
| *H04W 72/08* | (2009.01) | |
| *H04L 1/00* | (2006.01) | |
| *H04L 5/00* | (2006.01) | |
| *H04W 76/27* | (2018.01) | |
| *H04B 17/336* | (2015.01) | |

(52) U.S. Cl.
CPC .......... *H04L 1/0003* (2013.01); *H04L 1/0026* (2013.01); *H04L 5/0053* (2013.01); *H04L 43/0852* (2013.01); *H04L 43/0888* (2013.01); *H04W 24/10* (2013.01); *H04W 56/0055* (2013.01); *H04W 72/0453* (2013.01); *H04W 72/085* (2013.01); *H04W 76/27* (2018.02)

(58) Field of Classification Search
CPC .... H04L 43/0852; H04L 5/001; H04W 24/10; H04W 56/0005; H04W 56/0045; H04W 56/0055; H04W 56/0065; H04W 72/0453; H04W 72/085; H04W 76/15
USPC .......................................................... 370/350
See application file for complete search history.

(56) References Cited

U.S. PATENT DOCUMENTS

| | | | | |
|---|---|---|---|---|
| 2013/0195084 | A1* | 8/2013 | Chen | H04L 5/0048 370/336 |
| 2013/0272231 | A1* | 10/2013 | Dinan | H04W 52/34 370/329 |
| 2013/0279433 | A1* | 10/2013 | Dinan | H04J 11/00 370/329 |
| 2014/0314167 | A1* | 10/2014 | Jeong | H04B 7/0626 375/267 |
| 2016/0187458 | A1* | 6/2016 | Shah | H04W 64/00 455/456.1 |
| 2016/0227505 | A1 | 8/2016 | Loehr et al. | |
| 2016/0345316 | A1 | 11/2016 | Kazmi et al. | |
| 2017/0343642 | A1* | 11/2017 | Tee | H04W 56/0015 |
| 2018/0062776 | A1 | 3/2018 | Teshima et al. | |
| 2018/0213426 | A1* | 7/2018 | Latheef | H04L 43/0852 |
| 2018/0306897 | A1* | 10/2018 | Xue | H04W 64/00 |
| 2019/0386807 | A1* | 12/2019 | Kazmi | H04L 5/0078 |

OTHER PUBLICATIONS

QUALCOMM Incorporated: "Maximum TA and Processing Time," 3GPP Draft, 3GPP TSG RAN WG1 #90b, R1-1718116, Maximum TA And Processing Time, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341298, 4 pages, Retrieved from the Internet:URL: http://www.3gpp.org/ftp/Meetings_3GPP_SYNC/RAN1/Docs/ [retrieved on Oct. 8, 2017] the whole document.

* cited by examiner

THROUGHPUT MODIFICATION FOR TIME DELAYED CARRIERS

CROSS REFERENCE

The present Application for Patent claims the benefit of U.S. Provisional Patent Application No. 62/755,269 by GHEORGHIU et al., entitled "THROUGHPUT MODIFICATION FOR TIME DELAYED CARRIERS," filed Nov. 2, 2018, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support carrier aggregation (CA). CA may allow for UEs to receive communications via multiple carriers (e.g., component carriers, channels, frequency ranges, subcarriers), which may allow for higher data rates and throughput for a UE. In some cases, communications over multiple carriers may be received at different periods of time, creating a time delay between CA communications. The time delay between carriers may in some instances be unsuitable for successful reception at the UE, such as for high throughput communications or low latency communications.

SUMMARY

The described techniques relate to improved methods, systems, devices, and apparatuses that support throughput modification for time delayed carriers. Generally, the described techniques provide for a user equipment (UE) to perform a throughout degradation technique based on a time delay between communications received across multiple carriers. In some examples, the multiple carriers may include component carriers or other carriers such as channels, frequency ranges, subcarriers, etc. For example, multiple carriers may be configured for communications between a UE and one or more transmission reception points (e.g., a set of transmission points). The UE may receive communications over the multiple carriers, and determine a time delay (e.g., a time difference) between reception via one carrier and another carrier. In some cases, the time delay may be between contiguous communications (e.g., communications over a first carrier and communications over a second carrier), or between non-contiguous communications (e.g., communications over a first received carrier and communications over a last received carrier). The UE may determine the time delay is above or below a time delay threshold for the UE, which may, in some cases, be provided to the UE by a transmission reception point or other network entity, or may be preconfigured or standardized.

The UE may perform some actions based on whether the time delay is above or below the time delay threshold. For example, in cases where the UE determines the time delay is below the threshold, the UE may report to a serving transmission reception point that the time delay is below the threshold. In these cases, the transmission reception point may schedule communications to the UE without restrictions on the communications based on the report. In cases where the UE determines the time delay is above the threshold, the UE may report to a serving transmission reception point that the time delay exceeds the threshold. In these cases, the transmission reception point may schedule communications to the UE that mitigate the presence of the large time delay (e.g., avoid scheduling high throughput communications).

In other cases where the UE the time delay is above the threshold, the UE may perform one of several throughput degradation procedures. For example, the UE may limit channel quality indicator (CQI) reporting to some modular and coding schemes (MCSs). In other examples, the UE may limit the rank reported, such as the rank indicator (RI) in channel state feedback (CSF) to control the throughput. In other examples, the UE may transmit a non-acknowledgement (NACK) instead of an acknowledgement (ACK) for a corresponding received communication, which may force the transmitting transmission reception point to retransmit the communication instead of scheduling a new transmission. In yet other cases, the UE may drop one or more of the aggregated carriers, or indicate a lower CQI value or RI value to a transmission reception point for at least one of the aggregated carriers, which may limit throughput of subsequent communications. Accordingly, the UE may mitigate the effects of time delays on communications from aggregated carriers through transmission of a report indicating the time delay or difference, or by performing other throughput degradation procedures.

A method of wireless communications is described. The method may include identifying a set of carriers configured for communications between a UE and a set of transmission reception points (e.g., one or more transmission reception points), receiving a first communication via a first carrier of the set of carriers and a second communication via a second carrier of the set of carriers, determining a time difference between the first carrier and the second carrier based on receiving the first and second communications, and performing, by the UE, a throughput degradation procedure based on the determined time difference and a time difference threshold.

An apparatus for wireless communications is described. The apparatus may include a processor, memory in electronic communication with the processor, and instructions stored in the memory. The instructions may be executable by the processor to cause the apparatus to identify a set of carriers configured for communications between a UE and a set of transmission reception points, receive a first communication via a first carrier of the set of carriers and a second communication via a second carrier of the set of carriers, determine a time difference between the first carrier and the second carrier based on receiving the first and second communications, and perform, by the UE, a throughput degradation procedure based on the determined time difference and a time difference threshold.

Another apparatus for wireless communications is described. The apparatus may include means for identifying a set of carriers configured for communications between a UE and a set of transmission reception points, receiving a first communication via a first carrier of the set of carriers and a second communication via a second carrier of the set of carriers, determining a time difference between the first carrier and the second carrier based on receiving the first and second communications, and performing, by the UE, a throughput degradation procedure based on the determined time difference and a time difference threshold.

A non-transitory computer-readable medium storing code for wireless communications is described. The code may include instructions executable by a processor to identify a set of carriers configured for communications between a UE and a set of transmission reception points, receive a first communication via a first carrier of the set of carriers and a second communication via a second carrier of the set of carriers, determine a time difference between the first carrier and the second carrier based on receiving the first and second communications, and perform, by the UE, a throughput degradation procedure based on the determined time difference and a time difference threshold.

In some examples of the method, apparatuses, and non-transitory computer-readable medium described herein, performing the throughput degradation procedure may include operations, features, means, or instructions for transmitting a report to a transmission reception point of the set of transmission reception points, the report including an indication of the determined time difference.

Some examples of the method, apparatuses, and non-transitory computer-readable medium described herein may further include operations, features, means, or instructions for determining that the time difference may be below the time difference threshold, where the report indicates that the time difference may be below the time difference threshold.

Some examples of the method, apparatuses, and non-transitory computer-readable medium described herein may further include operations, features, means, or instructions for determining that the time difference exceeds the time difference threshold, where the report indicates that the time difference exceeds the time difference threshold.

In some examples of the method, apparatuses, and non-transitory computer-readable medium described herein, the indication includes a 1-bit indicator.

Some examples of the method, apparatuses, and non-transitory computer-readable medium described herein may further include operations, features, means, or instructions for receiving, from a transmission reception point of the set of transmission reception points, an indication of the time difference threshold.

In some examples of the method, apparatuses, and non-transitory computer-readable medium described herein, receiving the indication of the time difference threshold may include operations, features, means, or instructions for receiving a radio resource control (RRC) message that includes the indication of the time difference threshold.

In some examples of the method, apparatuses, and non-transitory computer-readable medium described herein, the time difference threshold may be a dynamic threshold, a semi-static threshold, or a static threshold associated with the UE or the set of carriers.

In some examples of the method, apparatuses, and non-transitory computer-readable medium described herein, performing the throughput degradation procedure may include operations, features, means, or instructions for identifying a channel quality reporting limit. In some examples, the channel quality reporting limit may be based on the determined time difference exceeding the time difference threshold, and transmitting a channel feedback report for at least one carrier of the set of carriers based on the channel quality reporting limit.

In some examples of the method, apparatuses, and non-transitory computer-readable medium described herein, the channel quality reporting limit includes an MCS limit, an RI limit, a number of receiver chains, or a combination thereof for the at least one carrier.

In some examples of the method, apparatuses, and non-transitory computer-readable medium described herein, the channel feedback report includes an indication of channel quality for a subset of the set of carriers.

Some examples of the method, apparatuses, and non-transitory computer-readable medium described herein may further include operations, features, means, or instructions for selecting the subset of the set of carriers for the indication of channel quality based on a signal to noise ratio (SNR) or a time delay associated with each carrier in the subset.

In some examples of the method, apparatuses, and non-transitory computer-readable medium described herein, performing the throughput degradation procedure may include operations, features, means, or instructions for transmitting, based on the determined time difference exceeding the time difference threshold, a NACK feedback message without processing a grant on at least one carrier of the set of carriers, or in response to a successful decoding of a communication on the at least one carrier of the set of carriers.

Some examples of the method, apparatuses, and non-transitory computer-readable medium described herein may further include operations, features, means, or instructions for dropping at least one of the first communication or the second communication based on the determined time difference exceeding the time difference threshold.

In some examples of the method, apparatuses, and non-transitory computer-readable medium described herein, the time difference threshold includes a maximum received time difference (MRTD) for the set of carriers.

A method of wireless communications is described. The method may include identifying a first carrier configured for communications between a UE and a transmission reception point, transmitting a first communication via the first carrier to the UE, receiving, from the UE, a report including an indication of a time difference between the first carrier and a second carrier configured for the UE, and scheduling a subsequent communication for the UE based on the indication of the time difference and a time difference threshold.

An apparatus for wireless communications is described. The apparatus may include a processor, memory in electronic communication with the processor, and instructions stored in the memory. The instructions may be executable by the processor to cause the apparatus to identify a first carrier configured for communications between a UE and a transmission reception point, transmit a first communication via the first carrier to the UE, receive, from the UE, a report including an indication of a time difference between the first carrier and a second carrier configured for the UE, and schedule a subsequent communication for the UE based on the indication of the time difference and a time difference threshold.

Another apparatus for wireless communications is described. The apparatus may include means for identifying a first carrier configured for communications between a UE and a transmission reception point, transmitting a first communication via the first carrier to the UE, receiving, from the UE, a report including an indication of a time difference between the first carrier and a second carrier configured for the UE, and scheduling a subsequent communication for the UE based on the indication of the time difference and a time difference threshold.

A non-transitory computer-readable medium storing code for wireless communications is described. The code may include instructions executable by a processor to identify a first carrier configured for communications between a UE and a transmission reception point, transmit a first communication via the first carrier to the UE, receive, from the UE, a report including an indication of a time difference between the first carrier and a second carrier configured for the UE, and schedule a subsequent communication for the UE based on the indication of the time difference and a time difference threshold.

Some examples of the method, apparatuses, and non-transitory computer-readable medium described herein may further include operations, features, means, or instructions for determining that the time difference may be below the time difference threshold based on the indication of the time difference, and scheduling the subsequent communication based on determining that the time difference may be below the time difference threshold.

Some examples of the method, apparatuses, and non-transitory computer-readable medium described herein may further include operations, features, means, or instructions for determining that the time difference exceeds the time difference threshold based on the indication of the time difference, and scheduling the subsequent communication based on determining that the time difference exceeds the time difference threshold.

In some examples of the method, apparatuses, and non-transitory computer-readable medium described herein, scheduling the subsequent communication may include operations, features, means, or instructions for adjusting an MCS parameter for the subsequent communication, and communicating the subsequent communication with the UE according to the adjusted MCS parameter.

Some examples of the method, apparatuses, and non-transitory computer-readable medium described herein may further include operations, features, means, or instructions for transmitting an indication of the time difference threshold to the UE, the time difference threshold being associated with the UE or a set of carriers associated with the UE.

In some examples of the method, apparatuses, and non-transitory computer-readable medium described herein, transmitting the indication of the time difference threshold may include operations, features, means, or instructions for transmitting a RRC message that includes the indication of the time difference threshold.

In some examples of the method, apparatuses, and non-transitory computer-readable medium described herein, the time difference threshold may be a dynamic threshold, a semi-static threshold, or a static threshold associated with the UE or the set of carriers.

Some examples of the method, apparatuses, and non-transitory computer-readable medium described herein may further include operations, features, means, or instructions for receiving a channel feedback report for the first carrier from the UE, the channel feedback report based on a channel quality reporting limit of the UE.

In some examples of the method, apparatuses, and non-transitory computer-readable medium described herein, the channel quality reporting limit includes an MCS limit, an RI limit, a number of receiver chains, or a combination thereof for the first carrier.

Some examples of the method, apparatuses, and non-transitory computer-readable medium described herein may further include operations, features, means, or instructions for receiving a NACK feedback message in response to the first communication based on the time difference exceeding the time difference threshold, and retransmitting the first communication to the UE based on the NACK feedback message.

In some examples of the method, apparatuses, and non-transitory computer-readable medium described herein, the time difference threshold includes an MRTD for the UE.

DETAILED DESCRIPTION

Figure 1:
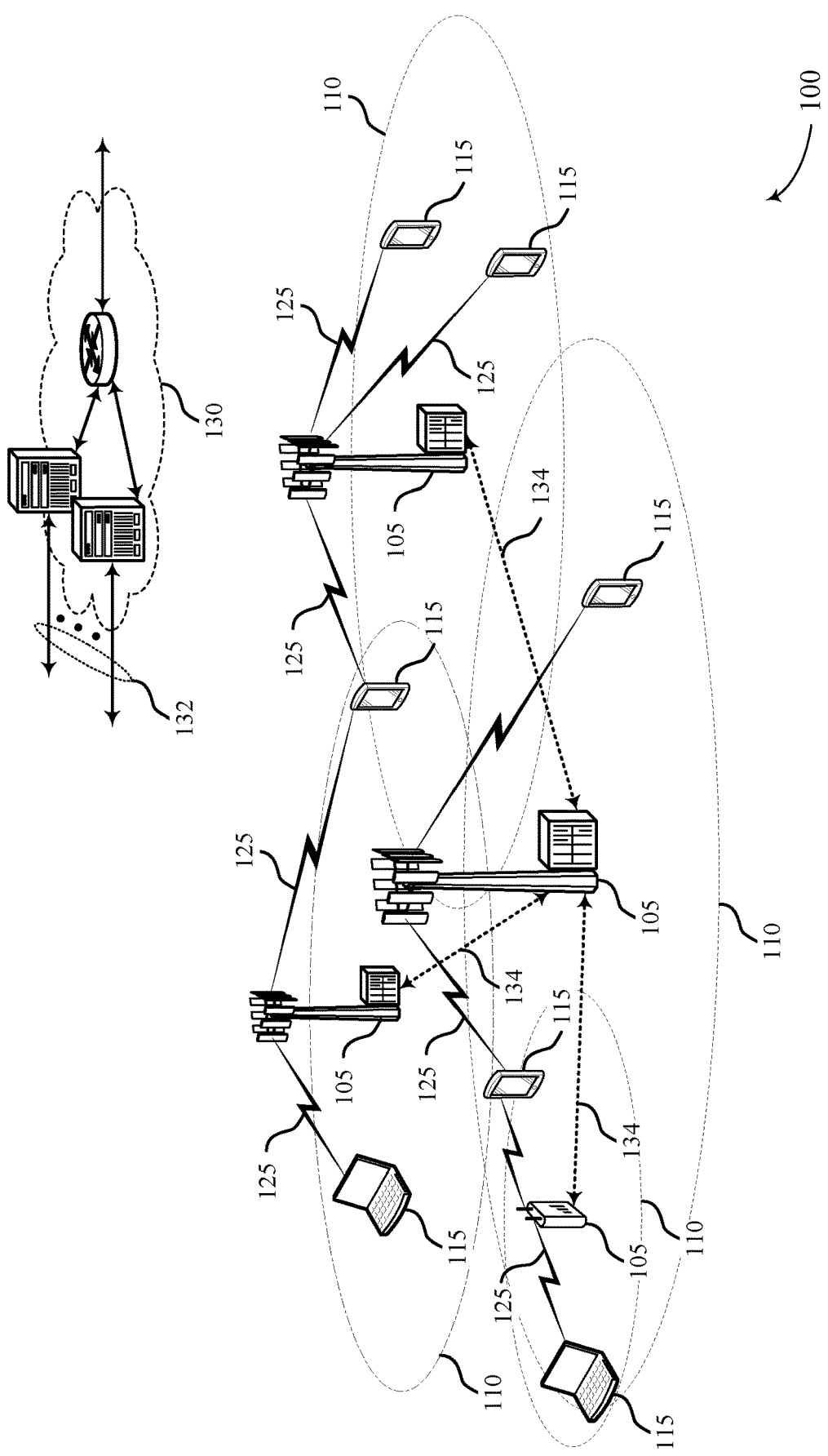
FIG. 1 illustrates an example of a wireless communications system that supports throughput modification for time delayed carriers in accordance with aspects of the present disclosure.

Some wireless communications systems may employ carrier aggregation (CA) techniques to increase throughput and data rates for communications. CA techniques may allow for multiple component carriers to serve a user equipment (UE) for communications. In some examples, the component carriers may be carriers, channels, frequency ranges, subcarriers, etc., or any other communication link supported by a wireless communications system. Each component carrier may include a frequency sub-band of an operating band, may be communicated in part by one or more transmission reception points (e.g., a set of transmission points), or may carry scheduled communications to the UE. A UE may receive communications over multiple component carriers and may aggregate the communications to receive packets. This aggregation may increase throughput and data rate at the UE as compared to single carrier communications.

In some cases, there may be a delay in reception between communications scheduled to be aggregated at the UE. For example, a first communication may be transmitted over a first component carrier, and may be received by the UE prior to reception of a second communication transmitted over a second component carrier. This difference in reception times may result in a time delay (e.g., a time difference) between reception and, in some cases, processing of the communications. If these communications are scheduled to be aggregated by the UE, the time delay may cause issues with baseband processes or with buffering processes, thereby wasting UE resources and causing inefficiency in communications.

Generally, aspects of the described techniques provide for a UE to mitigate the effects of time delays between reception of communications via multiple component carriers. For example, a UE may identify a set of component carriers configured for communications between the UE and a set of transmission reception points (e.g., one or more transmission points). The UE may then receive a first communication over a first component carrier and a second communication over a second component carrier of the set of component carriers and may determine a time difference between the first component carrier and the second component carrier based on the received first and second communications. Additionally, the UE may perform a throughput degradation procedure based on the determined time different and a time difference threshold. For example, the UE may transmit a report to one or more transmission reception points indicating the time difference between the two component carriers. The report may indicate that the time difference exceeds a time difference threshold, which may be indicated to the UE by a transmission reception point or other network entity. In some cases, the threshold may be received via radio resource control (RRC) signaling and the report may include a 1-bit indicator. Based on the received report, the base station may adjust subsequent communications (e.g., base station may adjust a modulation order or coding rate).

In other examples, a UE may not transmit a report and may instead attempt to mitigate throughput for subsequent communications by limiting channel quality indicator (CQI) reporting to some modular and coding schemes (MCSs) or limit the rank reported, such as the rank indicator (RI), in channel quality feedback message (e.g., a channel state feedback (CSF) message) to. In other cases, the UE may transmit a negative acknowledgement (NACK) instead of an acknowledgement (ACK) for a communication even if successfully receive, which may result in retransmission rather than a new packet transmission from a transmission reception point.

According to some aspects, the UE may drop one or more component carriers, or indicate a lower CQI value or RI value to a transmission reception point for a subset (or all) of the component carriers.

Particular aspects of the subject matter described herein may be implemented to realize one or more advantages. The described techniques may support improvements in communications using multiple component carriers for communication at a UE, which may improve reliability and throughput, as well as mitigating the effects of time delays between communications over different component carriers, among other advantages. As such, supported techniques may include improved network operations and, in some examples, may promote network efficiencies, among other benefits.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to throughput modification for time delayed carriers.

FIG. 1 illustrates an example of a wireless communications system 100 that supports throughput modification for time delayed carriers in accordance with aspects of the present disclosure. The wireless communications system 100 includes transmission reception points 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Transmission reception points 105 may wirelessly communicate with UEs 115 via one or more base station antennas. Transmission reception points 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include transmission reception points 105 of different types (e.g., macro or small cell base stations). The UEs 115 described herein may be able to communicate with various types of transmission reception points 105 and network equipment including macro eNBs, small cell eNBs, gNBs, relay base stations, and the like.

Each transmission reception point 105 may be associated with a particular geographic coverage area 110 in which communications with various UEs 115 is supported. Each transmission reception point 105 may provide communication coverage for a respective geographic coverage area 110 via communication links 125, and communication links 125 between a transmission reception point 105 and a UE 115 may utilize one or more carriers. Communication links 125 shown in wireless communications system 100 may include uplink transmissions from a UE 115 to a transmission reception point 105, or downlink transmissions from a transmission reception point 105 to a UE 115. Downlink transmissions may also be called forward link transmissions while uplink transmissions may also be called reverse link transmissions.

The geographic coverage area 110 for a transmission reception point 105 may be divided into sectors making up a portion of the geographic coverage area 110, and each sector may be associated with a cell. For example, each transmission reception point 105 may provide communication coverage for a macro cell, a small cell, a hot spot, or other types of cells, or various combinations thereof. In some examples, a transmission reception point 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same transmission reception point 105 or by different transmission reception points 105. The wireless communications system 100 may include, for example, a heterogeneous LTE/LTE-A/LTE-A Pro or NR network in which different types of transmission reception points 105 provide coverage for various geographic coverage areas 110.

The term "cell" refers to a logical communication entity used for communication with a transmission reception point 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a transmission reception point 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a transmission reception point 105. Other UEs 115 in such a group may be outside the geographic coverage area 110 of a transmission reception point 105, or be otherwise unable to receive transmissions from a transmission reception point 105. In some cases, groups of UEs 115 communicating via D2D communications may utilize a one-to-many (1:M) system in which each UE 115 transmits to every other UE 115 in the group. In some cases, a transmission reception point 105 facilitates the scheduling of resources for D2D communications. In other cases, D2D communications are carried out between UEs 115 without the involvement of a transmission reception point 105.

Transmission reception points 105 may communicate with the core network 130 and with one another. For example, transmission reception points 105 may interface with the core network 130 through backhaul links 132 (e.g., via an S1, N2, N3, or other interface). Transmission reception points 105 may communicate with one another over backhaul links 134 (e.g., via an X2, Xn, or other interface) either directly (e.g., directly between transmission reception points 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by transmission reception points 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a transmission reception point 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point. In some configurations, various functions of each access network entity or transmission reception point 105 may be distributed across various network devices (e.g., radio heads and access network controllers) or consolidated into a single network device (e.g., a transmission reception point 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and transmission reception points 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as transmission reception points 105 and UEs 115 may employ listen-before-talk (LBT) procedures to ensure a frequency channel is clear before transmitting data. In some cases, operations in unlicensed bands may be based on a CA configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, transmission reception point 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a transmission reception point 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a transmission reception point 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a transmission reception point 105 may use multiple antennas or antenna arrays to conduct beamforming operations for directional communications with a UE 115. For instance, some signals (e.g., synchronization signals, reference signals, beam selection signals, or other control signals) may be transmitted by a transmission reception point 105 multiple times in different directions, which may include a signal being transmitted according to different beamforming weight sets associated with different directions of transmission. Transmissions in different beam directions may be used to identify (e.g., by the transmission reception point 105 or a receiving device, such as a UE 115) a beam direction for subsequent transmission or reception by the transmission reception point 105.

Some signals, such as data signals associated with a particular receiving device, may be transmitted by a transmission reception point 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the transmission reception point 105 in different directions, and the UE 115 may report to the transmission reception point 105 an indication of the received signal with a highest signal quality, or an otherwise acceptable signal quality. Although these techniques are described with reference to signals transmitted in one or more directions by a transmission reception point 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the transmission reception point 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a transmission reception point 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a transmission reception point 105 may be located in diverse geographic locations. A transmission reception point 105 may have an antenna array with a number of rows and columns of antenna ports that the transmission reception point 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a transmission reception point 105 or core network 130 supporting radio bearers for user plane data. At the Physical layer, transport channels may be mapped to physical channels.

In some cases, UEs 115 and transmission reception points 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a transmission reception point 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., transmission reception points 105 or UEs 115) may have a hardware configuration that supports communications over a particular carrier bandwidth, or may be configurable to support communications over one of a set of carrier bandwidths. In some examples, the wireless communications system 100 may include transmission reception points 105 or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or transmission reception point 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to some aspects, a UE 115 may be configured with a set of component carriers for communications between the UE 115 and one or more transmission reception points 105 (or other network entities). The UE 115 may receive communications (e.g., data packets) over multiple component carriers, and may measure a time delay (e.g., a time difference ($\backslash$) between two component carriers based on communications received over one component carrier and communications received over another component carrier. Based on the time difference and a time difference threshold (which may be indicated to the UE 115 from a transmission reception point 105 or other network entity), the UE 115 may perform a throughput degradation procedure. The throughput degradation procedure may involve transmitting a report indicating the time difference and/or whether the time difference exceeds a time difference threshold (e.g., a received time difference (RTD) threshold or a maximum RTD (MRTD) threshold), transmitting a feedback report with channel quality information determined based on the time difference, or other techniques described herein.

Figure 2:
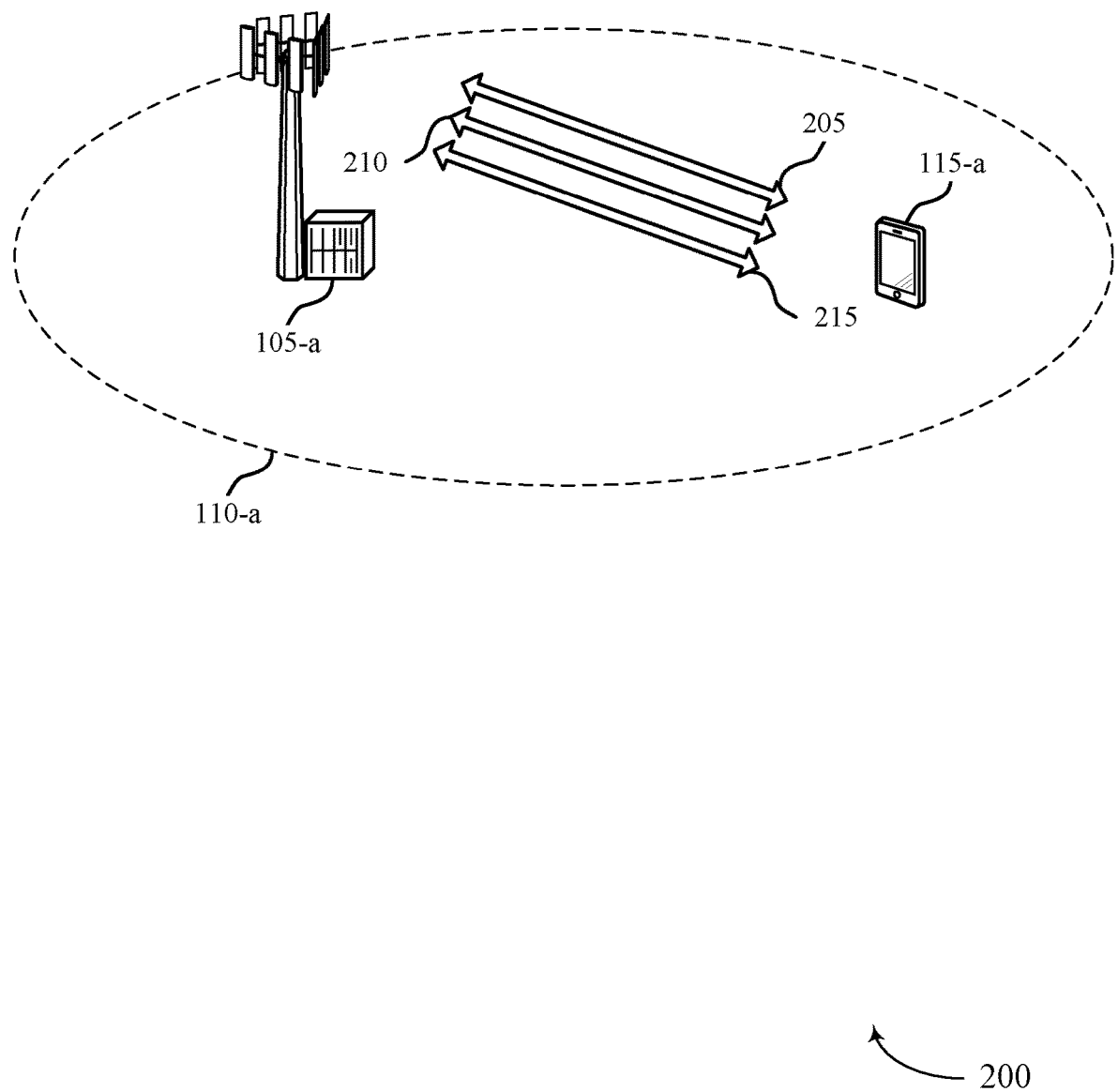
FIG. 2 illustrates an example of a wireless communications system that supports throughput modification for time delayed carriers in accordance with aspects of the present disclosure.

FIG. 2 illustrates an example of a wireless communications system 200 that supports throughput modification for time delayed carriers in accordance with aspects of the present disclosure. In some examples, wireless communications system 200 may implement aspects of wireless communications system 100. Wireless communications system 200 may utilize CA techniques for transmitting and receiving communications. For example, transmission reception point 105-a and UE 115-a may communicate over a set of component carriers (e.g., component carrier 205, component carrier 210, component carrier 215). In some cases, transmission reception point 105-a and UE 115-a may communicate over a subset of component carriers 205, 210, and 215, such as component carrier 205 and component carrier 215. Additionally or alternatively, although not shown, UE 115-*a* may communicate with multiple transmission reception points 105 via the set of component carriers 205, 210, and 215. For example, UE 115-*a* may communicate with transmission reception point 105-*a* using component carrier 205, and communicate with another transmission reception point (not shown) using component carrier 210 and/or 215. In some examples, the component carriers 210 or 215 may be carriers, channels, frequency ranges, subcarriers, etc., or any other communication link supported by a wireless communications system Component carriers 205, 210, and 215 may carry communications scheduled to be aggregated by the UE 115-*a*. Aggregation of communications across different component carriers may include receiving multiple communications across different component carriers and combining (e.g., processing) the multiple communications together to form an aggregated communication. For example, component carrier 205 may carry a first communication from transmission reception point 105-*a*, and component carrier 210 may carry a second communication from transmission reception point 105-*a* (or another transmission reception point). The UE 115-*a* may receive both the first communication and the second communication, and may combine the first communication and the second communication to form an aggregated communication.

In some cases, UE 115-*a* may receive communications scheduled to be aggregated at different times. For example, UE 115-*a* may receive a first communication over component carrier 205 at a time earlier than a second communication over component carrier 210. The time difference between reception or processing of the communications may also be referred to as a time delay or time difference.

UE 115-*a* may support a MRTD between aggregated communications. For example, some UEs 115 may support a MRTD of 33 microseconds (μs) (e.g., 30 μs for propagation time and 3 μs for synchronization error between transmission reception point 105 transmitting the communications) for inter-band CA. In some examples, the MRTD value may be small relative to the time period for a TTI (e.g., subframe, slot, mini-slot, symbol) carrying the CA communications. For example, a 33 μs MRTD may be small relative to a TTI duration of 1 ms. However, in some other cases, the MRTD may be large relative to the time period for a TTI. For example, a 33 μs MRTD may be large relative to a TTI duration of 0.125 ms (e.g., in, NR systems, sTTIs, or for other low latency communications). Other TTI durations may be considered without departing from the scope of the disclosure.

The relatively large MRTD may cause issues with aggregating communications. For example, large MRTD values relative to TTI size may cause baseband processing of communications to be more complex. Additionally or alternatively, large MRTD values relative to TTI size may cause an increase in memory usage (e.g., if the UE 115-*a* assumes the large MRTD value will be experienced in communicating).

Wireless communications system 200 may also employ dynamic TTI lengths for aggregated communications. For example, wireless communications system 200 may support a TTI length may scale with a utilized subcarrier spacing (SCS) for a component carrier. This TTI length scaling may cause issues with a static MRTD value, which may be relatively large or small based on the carrying TTI lengths utilized for communications. While dynamic MRTD value may address this issue, a dynamic MRTD may cause issues or inefficiencies in communications (e.g., in cases where the MRTD changes but the TTI length utilized does not change).

Wireless communications system 200 may support techniques to reduce (e.g., minimize) the burden on UE 115-*a* processing and/or memory by limiting a throughput beyond some delay. For example, UE 115-*a* may support a maximum throughput (e.g., bandwidth for a communication multiplied by the number of spatial layers for a communication multiplied by a modulation order for the communication) of up to 20 μs MRTD. Further, UE 115-*a* may be allowed a maximum throughput degradation beyond 20 μs (e.g., bandwidth for a communication multiplied by the number of spatial layers for a communication multiplied by a modulation order for the communication multiplied by a number N, where N is less than 1 (e.g., 0.6, 0.7, 0.8)).

UE 115-*a* may report to transmission reception point 105-*a* that a measured MRTD is above or below a threshold (a variable threshold, a preconfigured or standardized threshold, etc.). UE 115-*a* may be configured with a threshold for reporting throughput limitations. In some cases, UE 115-*a* may receive a threshold indication from transmission reception point 105-*a* (e.g., via RRC signaling) or from another network entity. UE 115-*a* may measure a time delay between a first communication received over a first component carrier and a second communication received over a second component carrier. UE 115-*a* may compare the measured time delay to the threshold. UE 115-*a* may determine that the measured time delay may be above or below the threshold. UE 115-*a* may then report to transmission reception point 105-*a* whether the measured MRTD is above or below the threshold.

Transmission reception point 105-*a* may schedule transmissions differently based on whether the report indicates the measured MRTD is above or below the threshold. If the report indicates the measured MRTD is below the threshold, transmission reception point 105-*a* may schedule communications with UE 115-*a* without restrictions (e.g., without throughput restrictions). If the report indicates the measured MRTD is above the threshold, transmission reception point 105-*a* may refrain from scheduling high data throughput communications with UE 115-*a* (e.g., refrain from scheduling high order MCS communications for UE 115-*a*).

Additionally or alternatively, UE 115-*a* may perform other throughput degradation procedures based on the measured MRTD being above the threshold. In some cases, UE 115-*a* may limit CQI reporting to some MCS indices to limit throughput. For example, UE 115-*a* may limit CQI reporting to lower MCSs, which may indicate to transmission reception point 105-*a* to schedule lower MCS communications. Additionally or alternatively, UE 115-*a* may limit RI values provided in CSF message to control maximum throughput for communications. Additionally or alternatively, UE 115-*a* may transmit a NACK to transmission reception point 105-*a* in response to receiving an aggregated communication. This may cause transmission reception point 105-*a* to retransmit the received aggregated communication, instead of transmitting new data to UE 115-*a*.

In some cases, UE 115-*a* may perform a throughput degradation procedure for a subset of component carriers rather than across all component carriers. For example, UE 115-*a* may drop one or more aggregated component carriers based on the measured MRTD being above a threshold. UE 115-*a* may, in some cases, be configured for communications over more component carriers in a particular frequency band as compared to a different frequency band. UE 115-*a* may drop component carriers in the particular frequency band, in the different frequency band, or both. Additionally or alternatively, UE 115-a may transmit lower CQI or RI values for a subset of aggregated component carriers, which may limit throughput for subsequent communications over the subset of component carriers. For example, component carriers chosen for the lower CQI or RI values may be chosen based on a possible highest SNR or time delay (e.g., SNR on some CCs may be capped due to radio frequency (RF) droop or RF impairments). In some cases, UE 115-a may reduce the number of receiver chains for one or more of the aggregated component carriers, which may limit throughput for subsequent communications.

Figure 3:
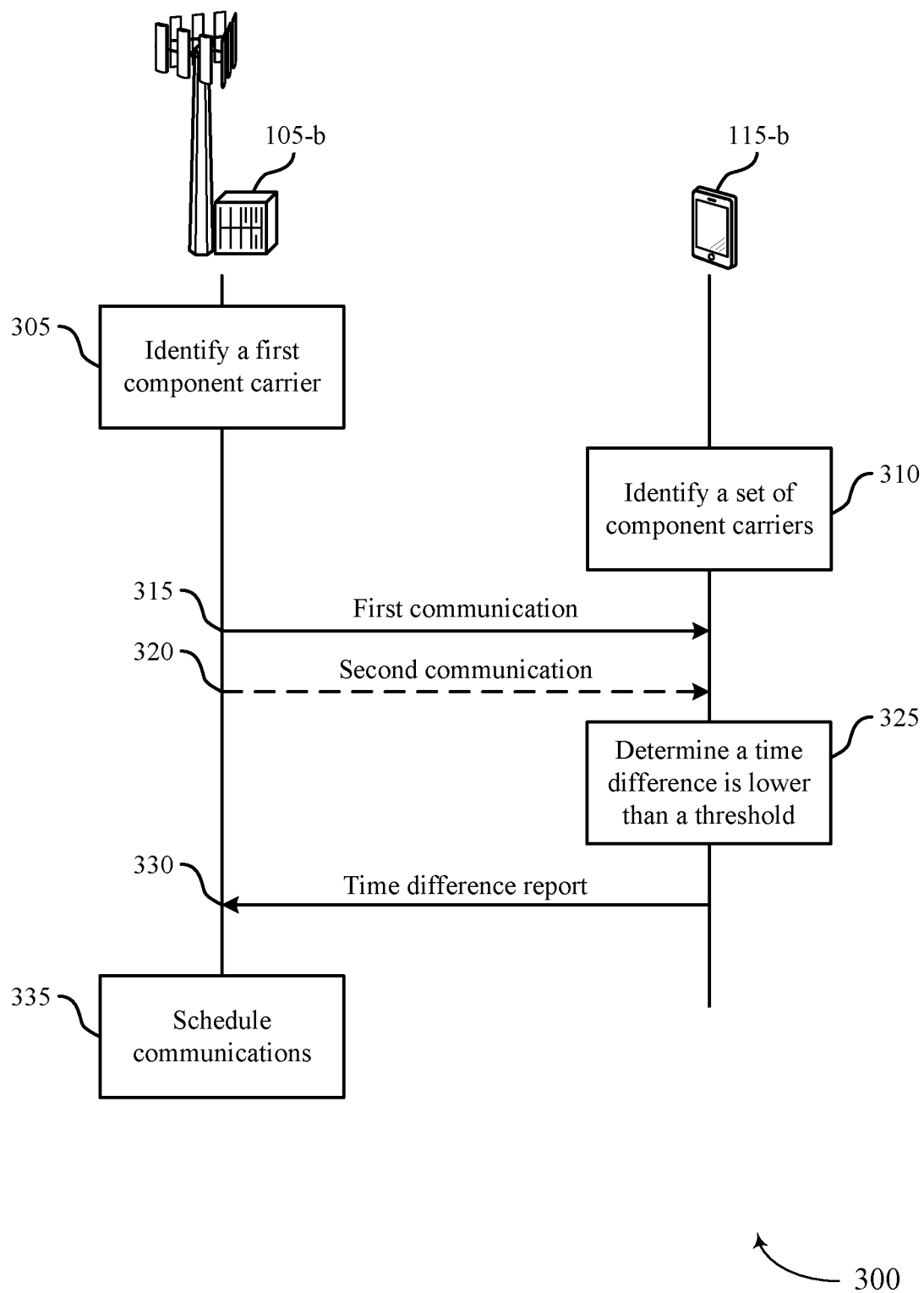
FIG. 3 illustrates an example of a process flow that supports throughput modification for time delayed carriers in accordance with aspects of the present disclosure.

FIG. 3 illustrates an example of a process flow 300 that supports throughput modification for time delayed carriers in accordance with aspects of the present disclosure. In some examples, process flow 300 may implement aspects of wireless communications systems 100 or 200. In some examples, the wireless communications systems 100 or 200 may support CA, which may allow for UEs to receive communications via multiple carriers (e.g., component carriers, channels frequency ranges, subcarriers). Process flow 300 may include a transmission reception point 105-b and UE 115-b, which may be examples of transmission reception point 105 and UE 115 as described herein.

At 305, transmission reception point 105-b may identify a first component carrier configured for communications between UE 115-b and transmission reception point 105-b. At 310, the UE 115-b may identify a set of component carriers configured for the UE 115-b. The set of component carriers may include one or more component carriers configured for communications between the UE 115-b and the transmission reception point 105-b. Additionally or alternatively, the set of component carrier may include one or more carrier configured for communications between the UE 115-b and other transmission reception point(s).

At 315, transmission reception point 105-b may transmit, and UE 115-b may receive, a first communication via the first component carrier configured for communications between the UE 115-b and the transmission reception point 105-b. Optionally, at 320, UE 115-b may receive a second communication via a second component carrier from transmission reception point 105-b. In some examples, however, the second communication may be received from a transmission reception point other than transmission reception point 105-b.

At 325, UE 115-b may determine a time difference between the first component carrier and the second component carrier based at least in part on receiving the first and second communications. In some examples, UE 115-b may determine that the time difference is above or below a time difference threshold. In some cases, the time difference threshold is a dynamic threshold, a semi-static threshold, or a static threshold associated with the UE or the set of component carriers.

At 330, UE 115-b may perform a throughput degradation procedure based at least in part on the determined time difference and the time difference threshold such as transmitting a report to transmission reception point 105-b or another transmission reception point. The report may include an indication of the determined time difference and/or whether the time difference is above or below the time difference threshold.

At 335, the transmission reception point 105-b may schedule subsequent communication(s) based on the received time difference report. For example, transmission reception point 105-b may determine that the time difference exceeds the time difference threshold and schedule the subsequent communication based at least in part on determining that the time difference exceeds the time difference threshold. Scheduling the communication(s) may include adjusting an MCS parameter for the subsequent communication and communicating the subsequent communication with the UE according to the adjusted MCS parameter.

Figure 4:
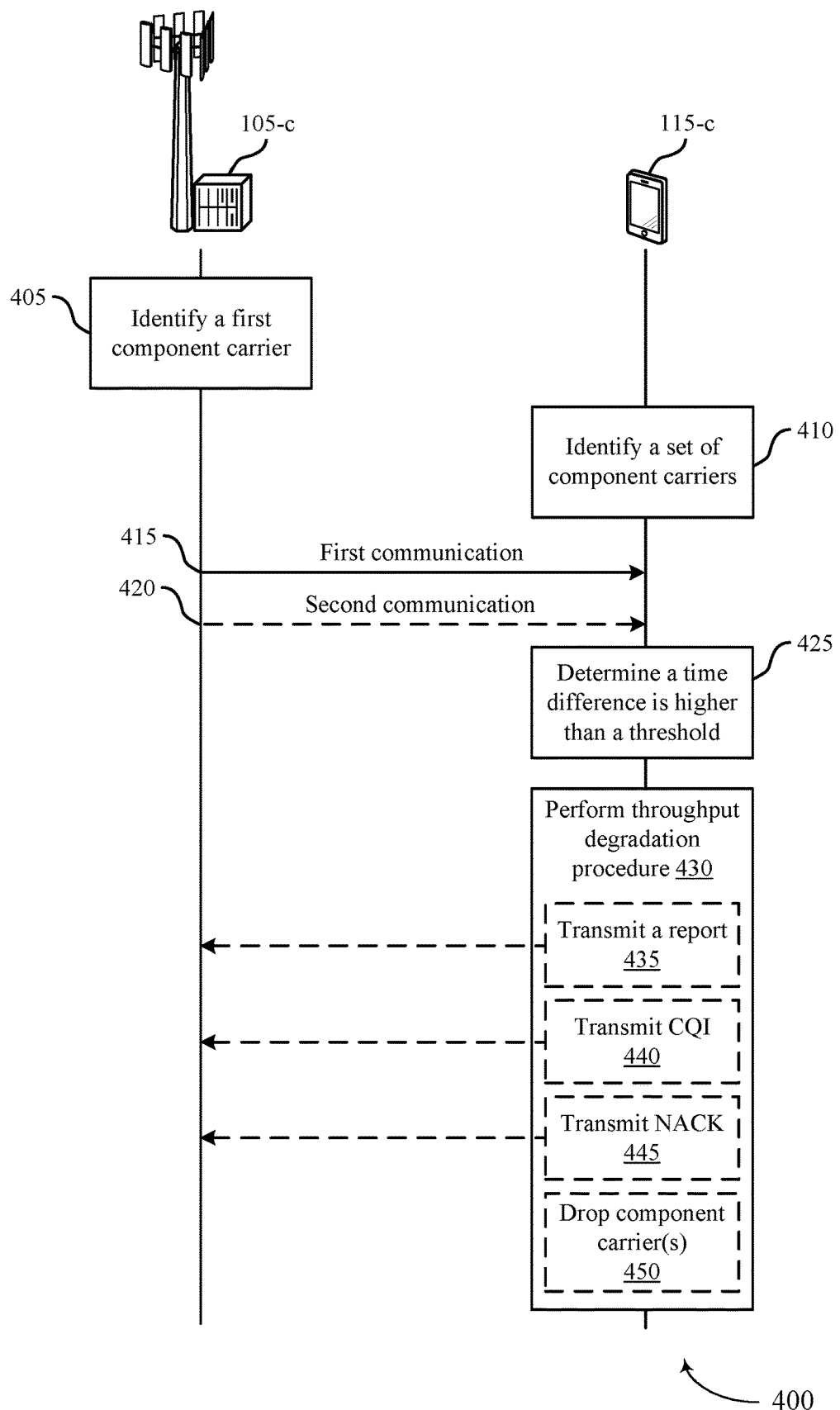
FIG. 4 illustrates an example of a process flow that supports throughput modification for time delayed carriers in accordance with aspects of the present disclosure.

FIG. 4 illustrates an example of a process flow 400 that supports throughput modification for time delayed carriers in accordance with aspects of the present disclosure. In some examples, process flow 400 may implement aspects of wireless communications systems 100 or 200. In some examples, the wireless communications systems 100 or 200 may support CA, which may allow for UEs to receive communications via multiple carriers (e.g., component carriers, channels, frequency ranges, subcarriers). Process flow 400 may include a transmission reception point 105-c and UE 115-c, which may be examples of transmission reception point 105 and UE 115 as described herein.

At 405, transmission reception point 105-c may identify a first component carrier configured for communications between UE 115-c and transmission reception point 105-c. At 410, the UE 115-c may identify a set of component carriers configured for the UE 115-c. The set of component carriers may include one or more component carriers configured for communications between the UE 115-c and the transmission reception point 105-c. Additionally or alternatively, the set of component carrier may include one or more carrier configured for communications between the UE 115-c and other transmission reception point(s).

At 415, transmission reception point 105-c may transmit, and UE 115-c may receive, a first communication via the first component carrier configured for communications between the UE 115-c and the transmission reception point 105-c. Optionally, at 420, UE 115-c may receive a second communication via a second component carrier from transmission reception point 105-c. In some examples, however, the second communication may be received from a transmission reception point other than transmission reception point 105-c. At 425, UE 115-c may determine a time difference between the first component carrier and the second component carrier based at least in part on receiving the first and second communications. In some examples, UE 115-c may determine that the time difference is above or below a time difference threshold.

At 430, UE 115-c may perform a throughput degradation procedure based at least in part on the determined time difference and a time difference threshold. In some cases, the time difference threshold is a dynamic threshold, a semi-static threshold, or a static threshold associated with the UE or the set of component carriers. Optionally at 435, performing a throughput degradation procedure may include transmitting a report to transmission reception point 105-c or another transmission reception point. The report may include an indication of the determined time difference. Optionally at 440, performing a throughput degradation procedure may include identifying a channel quality reporting limit. In some examples, the channel quality reporting limit may be based at least in part on the determined time difference exceeding the time difference threshold, and transmitting a channel feedback report (e.g., transmit CQI) for at least one component carrier of the set of component carriers based at least in part on the channel quality reporting limit. In some cases, the channel quality reporting limit includes an MCS limit, an RI limit, a number of receiver chains (e.g., a reduce number), or a combination thereof for the first component carrier.

Optionally at 445, performing a throughput degradation procedure may include identifying a successful decoding of a communication from at least one component carrier of the set of component carriers. Additionally or alternatively, at 445, performing a throughput degradation procedure may include transmitting, based on the determined time difference exceeding the time difference threshold, a NACK feedback message without processing a grant on at least one carrier of the set of carriers, or in response to a successful decoding of a communication on the at least one carrier of the set of carriers. Optionally at 450, performing a throughput degradation procedure may include dropping at least one of the first communication or the second communication based at least in part on the determined time difference exceeding the time difference threshold.

Figure 5:
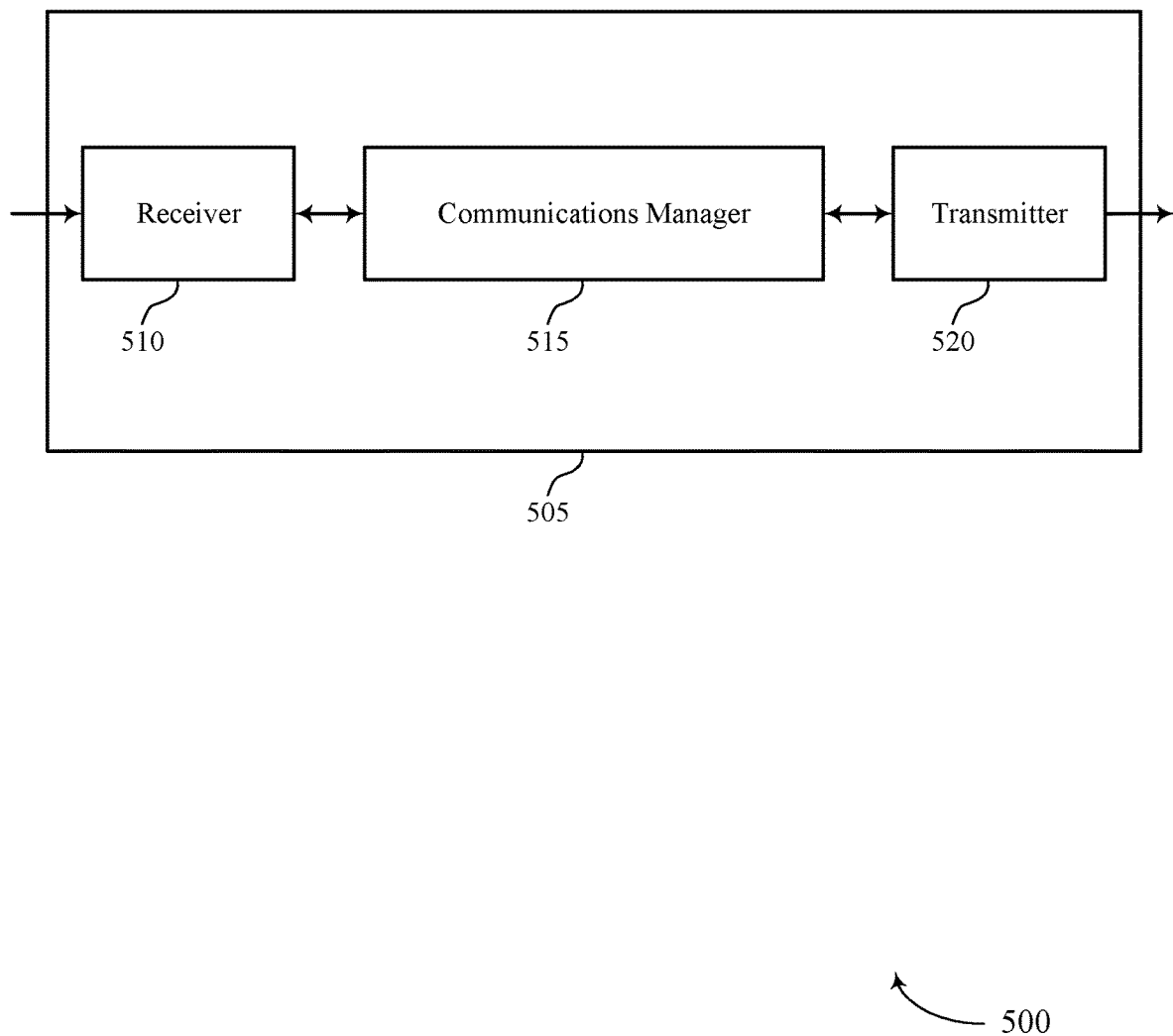
FIGS. 5 and 6 show block diagrams of devices that support throughput modification for time delayed carriers in accordance with aspects of the present disclosure.

FIG. 5 shows a block diagram 500 of a device 505 that supports throughput modification for time delayed carriers in accordance with aspects of the present disclosure. The device 505 may be an example of aspects of a UE 115 as described herein. In some examples, the UEs 115 may receive communications via multiple carriers (e.g., component carriers, channels, frequency ranges, subcarriers). The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to throughput modification for time delayed carriers, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of component carriers configured for communications between a UE and a set of transmission reception points (e.g., one or more transmission reception points), receive a first communication via a first component carrier of the set of component carriers and a second communication via a second component carrier of the set of component carriers, determine a time difference between the first component carrier and the second component carrier based on receiving the first and second communications, and perform a throughput degradation procedure based on the determined time difference and a time difference threshold. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to perform a throughput degradation technique based on a time delay between communications received over multiple component carriers. The throughput degradation technique may involve the device 505 limiting CQI, RI, or other parameters in a CSF, which may improve throughput. Such techniques also may mitigate the effects of the time delay between component carriers.

Based on techniques for implementing sidelink groupcast reachability based scheduling as described herein, a processor of a UE 115 (e.g., controlling the receiver 510, the transmitter 520, or the transceiver 820 as described with reference to FIG. 8) may increase reliability and throughput when utilizing multiple component carriers in a carrier aggregation communications scheme.

Figure 6:
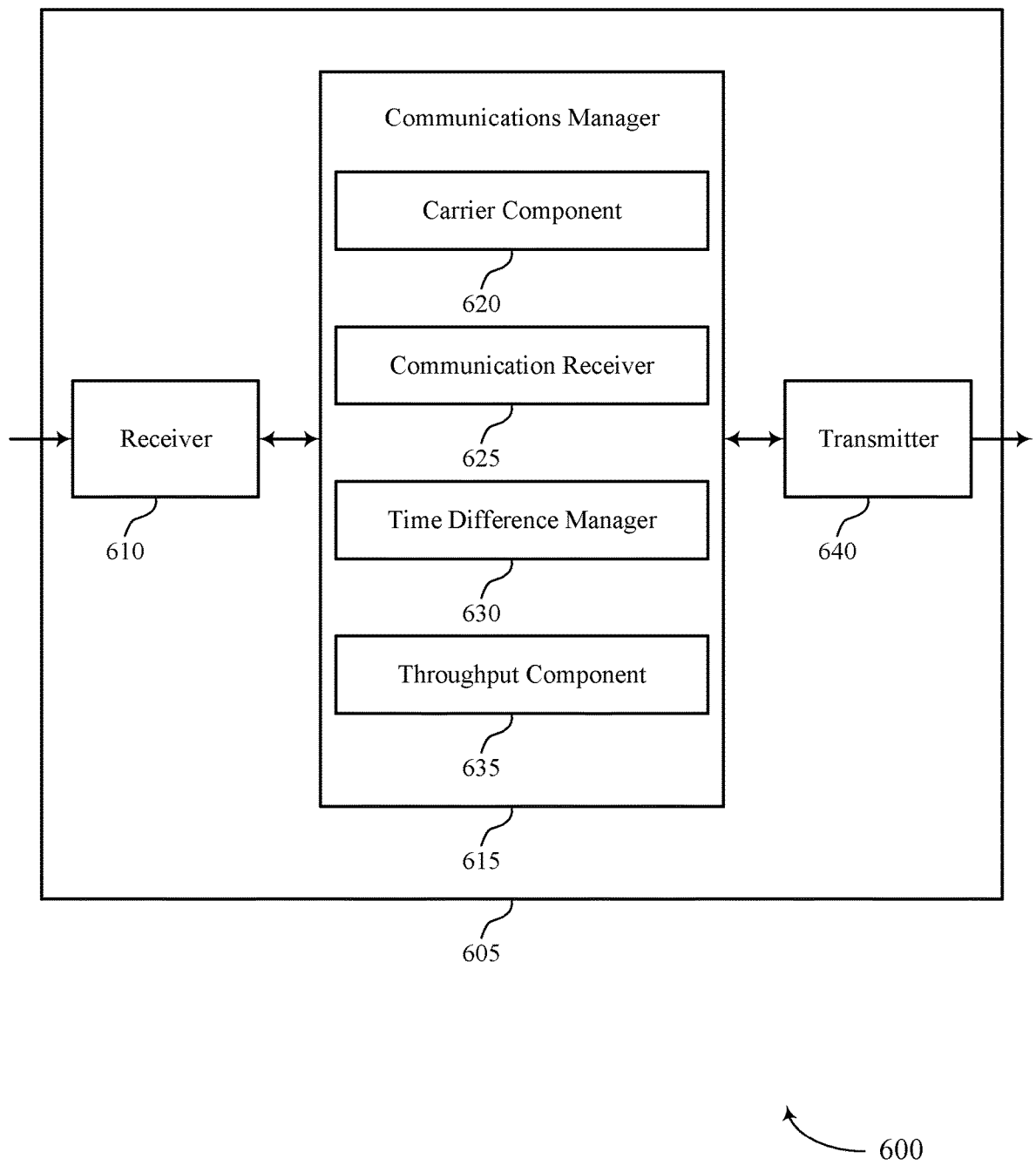

FIG. 6 shows a block diagram 600 of a device 605 that supports throughput modification for time delayed carriers in accordance with aspects of the present disclosure. The device 605 may be an example of aspects of a device 505, or a UE 115 as described herein. In some examples, the UEs 115 may receive communications via multiple carriers (e.g., component carriers, channels, frequency ranges, subcarriers). The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to throughput modification for time delayed carriers, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a carrier component 620, a communication receiver 625, a time difference manager 630, and a throughput component 635. The communications manager 615 may be an example of aspects of the communications manager 810 described herein.

The carrier component 620 may identify a set of component carriers configured for communications between a UE and a set of transmission reception points. The communication receiver 625 may receive a first communication via a first component carrier of the set of component carriers and a second communication via a second component carrier of the set of component carriers. The time difference manager 630 may determine a time difference between the first component carrier and the second component carrier based on receiving the first and second communications.

The throughput component 635 may perform throughput degradation procedure based on the determined time difference and a time difference threshold. The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
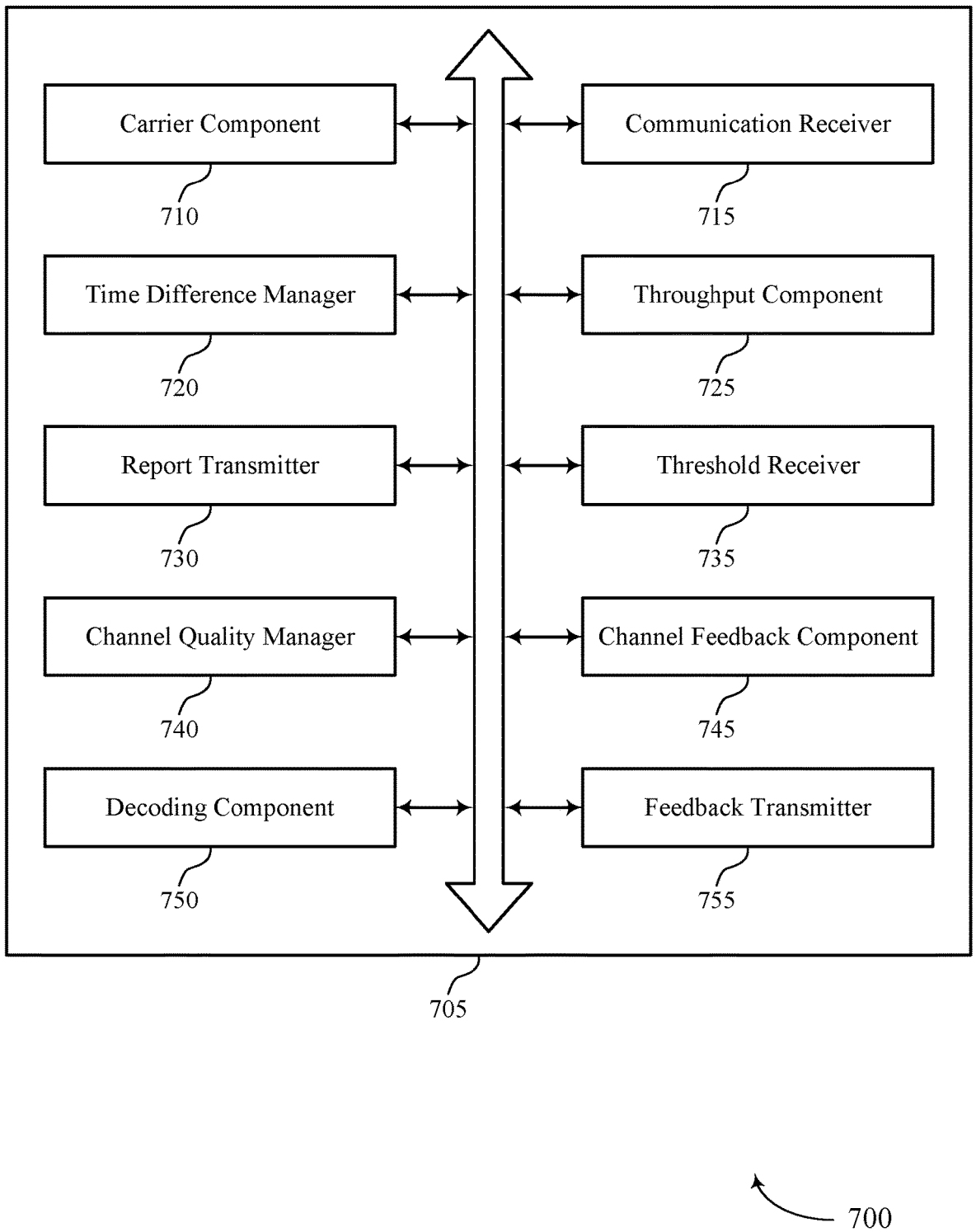
FIG. 7 shows a block diagram of a communications manager that supports throughput modification for time delayed carriers in accordance with aspects of the present disclosure.

FIG. 7 shows a block diagram 700 of a communications manager 705 that supports throughput modification for time delayed carriers in accordance with aspects of the present disclosure. The communications manager 705 may be an example of aspects of a communications manager 515, a communications manager 615, or a communications manager 810 described herein. The communications manager 705 may include a carrier component 710, a communication receiver 715, a time difference manager 720, a throughput component 725, a report transmitter 730, a threshold receiver 735, a channel quality manager 740, a channel feedback component 745, a decoding component 750, and a feedback transmitter 755. Each of these modules may communicate, directly or indirectly, with one another (e.g., via one or more buses).

The carrier component 710 may identify a set of component carriers (e.g., carriers, channels, frequency ranges, subcarriers) configured for communications between a UE and a set of transmission reception points. The communication receiver 715 may receive a first communication via a first component carrier of the set of component carriers and a second communication via a second component carrier of the set of component carriers.

The time difference manager 720 may determine a time difference between the first component carrier and the second component carrier based on receiving the first and second communications. In some examples, the time difference manager 720 may determine that the time difference is below the time difference threshold, where the report indicates that the time difference is below the time difference threshold. In some cases, the time difference manager 720 may determine that the time difference exceeds the time difference threshold, where the report indicates that the time difference exceeds the time difference threshold.

The throughput component 725 may perform a throughput degradation procedure based on the determined time difference and a time difference threshold. In some examples, the throughput component 725 may drop at least one of the first communication or the second communication based on the determined time difference exceeding the time difference threshold. In some cases, the time difference threshold includes an MRTD for the set of component carriers. The report transmitter 730 may transmit a report to a transmission reception point of the set of transmission reception points, the report including an indication of the determined time difference. In some cases, the indication includes a 1-bit indicator.

The threshold receiver 735 may receive, from a transmission reception point of the set of transmission reception points, an indication of the time difference threshold. In some examples, receiving the indication of the time difference threshold includes receiving a RRC message that includes the indication of the time difference threshold. In some cases, the time difference threshold is a dynamic threshold, a semi-static threshold, or a static threshold associated with the UE or the set of component carriers.

The channel quality manager 740 may identify a channel quality reporting limit. In some examples, the channel quality reporting limit may be based on the determined time difference exceeding the time difference threshold. In some cases, the channel quality reporting limit includes an MCS limit, an RI limit, a number of receiver chains, or a combination thereof for the at least one component carrier.

The channel feedback component 745 may transmit a channel feedback report for at least one component carrier of the set of component carriers based on the channel quality reporting limit. In some examples, the channel feedback component 745 may select the subset of the set of component carriers for the indication of channel quality based on an SNR or a time delay associated with each component carrier in the subset. In some cases, the channel feedback report includes an indication of channel quality for a subset of the set of component carriers. The decoding component 750 may identify a successful decoding of a communication from at least one component carrier of the set of component carriers. The feedback transmitter 755 may transmit, based on the determined time difference exceeding the time difference threshold, a NACK feedback message without processing a grant on at least one carrier of the set of carriers, or in response to the successful decoding of a communication on the at least one carrier of the set of carriers.

Figure 8:
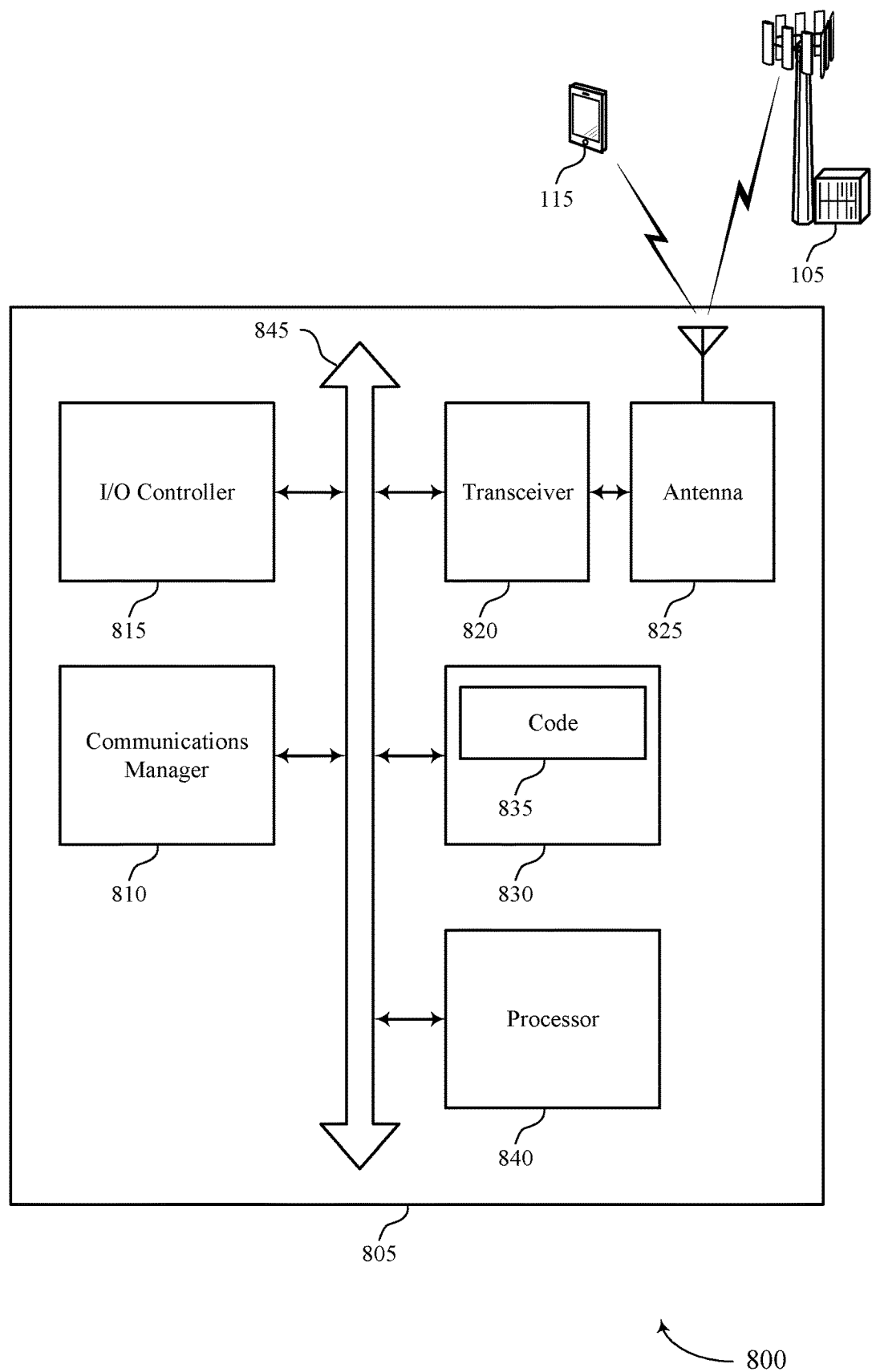
FIG. 8 shows a diagram of a system including a device that supports throughput modification for time delayed carriers in accordance with aspects of the present disclosure.

FIG. 8 shows a diagram of a system 800 including a device 805 that supports throughput modification for time delayed carriers in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of component carriers (e.g., carriers, channels, frequency ranges, subcarriers) configured for communications between a UE and a set of transmission reception points, receive a first communication via a first component carrier of the set of component carriers and a second communication via a second component carrier of the set of component carriers, determine a time difference between the first component carrier and the second component carrier based on receiving the first and second communications, and perform a throughput degradation procedure based on the determined time difference and a time difference threshold.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting throughput modification for time delayed carriers).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
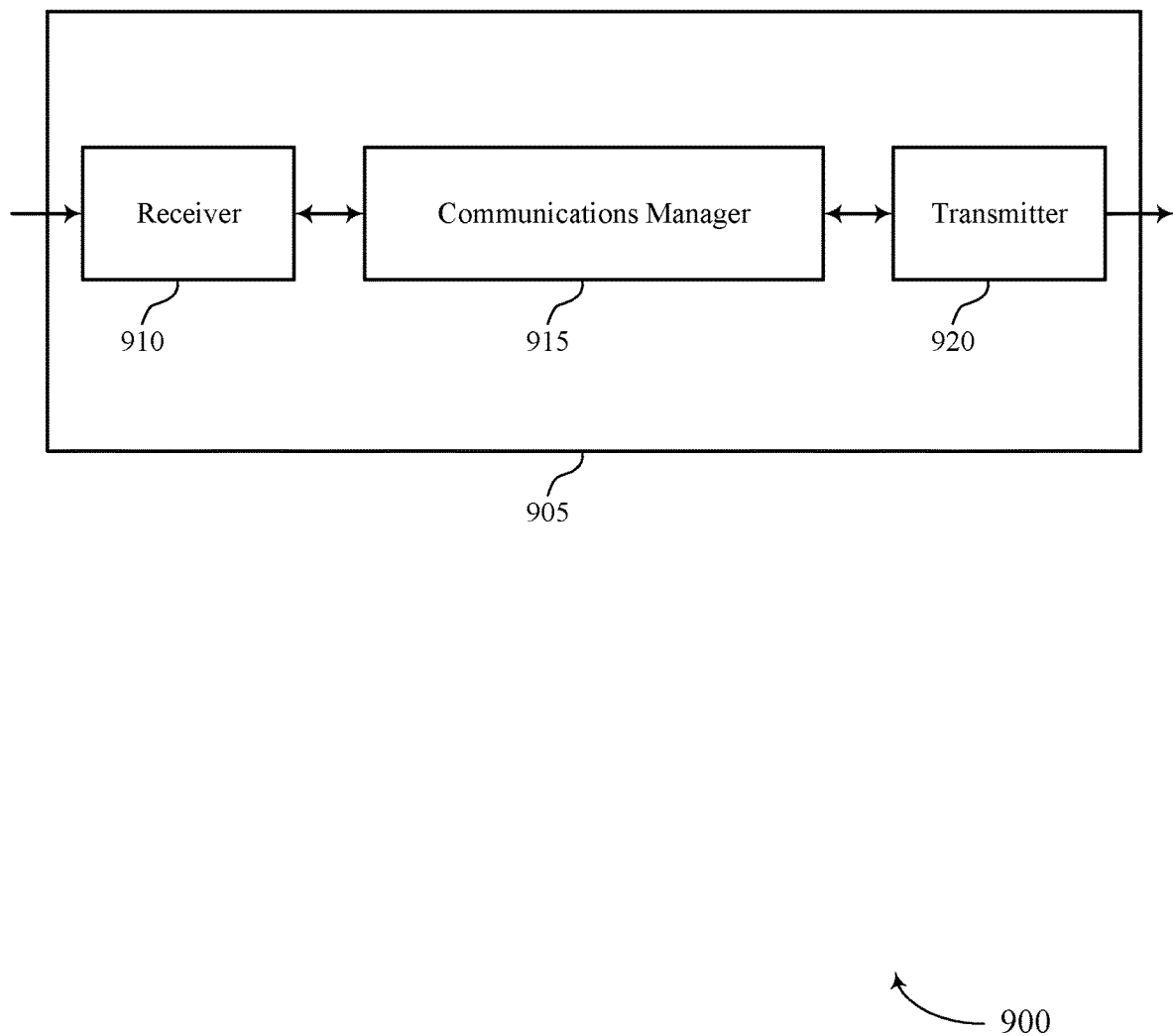
FIGS. 9 and 10 show block diagrams of devices that support throughput modification for time delayed carriers in accordance with aspects of the present disclosure.

FIG. 9 shows a block diagram 900 of a device 905 that supports throughput modification for time delayed carriers in accordance with aspects of the present disclosure. The device 905 may be an example of aspects of a transmission reception point 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to throughput modification for time delayed carriers, etc.). Information may be passed on to other components of the device 905. The receiver 910 may be an example of aspects of the transceiver 1220 described with reference to FIG. 12. The receiver 910 may utilize a single antenna or a set of antennas. One or more component carriers, referenced herein, may be include one or more carriers, channels, frequency ranges, subcarriers, etc.

The communications manager 915 may identify a first component carrier configured for communications between a UE and a transmission reception point, transmit a first communication via the first component carrier to the UE, receive, from the UE, a report including an indication of a time difference between the first component carrier and a second component carrier configured for the UE, and schedule a subsequent communication for the UE based on the indication of the time difference and a time difference threshold. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
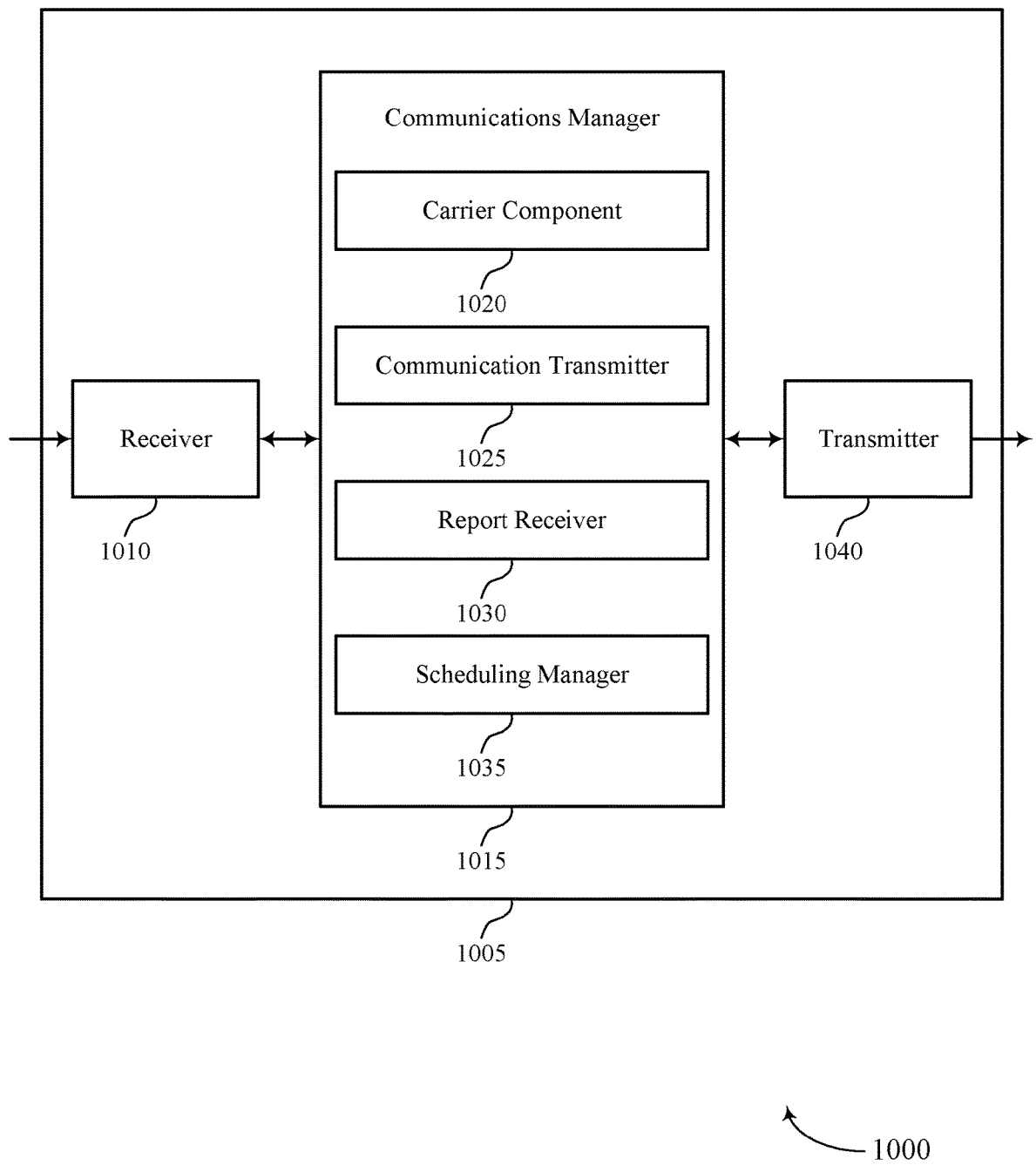

FIG. 10 shows a block diagram 1000 of a device 1005 that supports throughput modification for time delayed carriers in accordance with aspects of the present disclosure. The device 1005 may be an example of aspects of a device 905, or a transmission reception point 105 as described herein. The device 1005 may include a receiver 1010, a communications manager 1015, and a transmitter 1040. The device 1005 may also include a processor. Each of these components may be in communication with one another (e.g., via one or more buses). One or more component carriers, referenced herein, may be include one or more carriers, channels, frequency ranges, subcarriers, etc.

The receiver 1010 may receive information such as packets, user data, or control information associated with various information channels (e.g., control channels, data channels, and information related to throughput modification for time delayed carriers, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a carrier component 1020, a communication transmitter 1025, a report receiver 1030, and a scheduling manager 1035. The communications manager 1015 may be an example of aspects of the communications manager 1210 described herein.

The carrier component 1020 may identify a first component carrier configured for communications between a UE and a transmission reception point. The communication transmitter 1025 may transmit a first communication via the first component carrier to the UE. The report receiver 1030 may receive, from the UE, a report including an indication of a time difference between the first component carrier and a second component carrier configured for the UE.

The scheduling manager 1035 may schedule a subsequent communication for the UE based on the indication of the time difference and a time difference threshold. The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
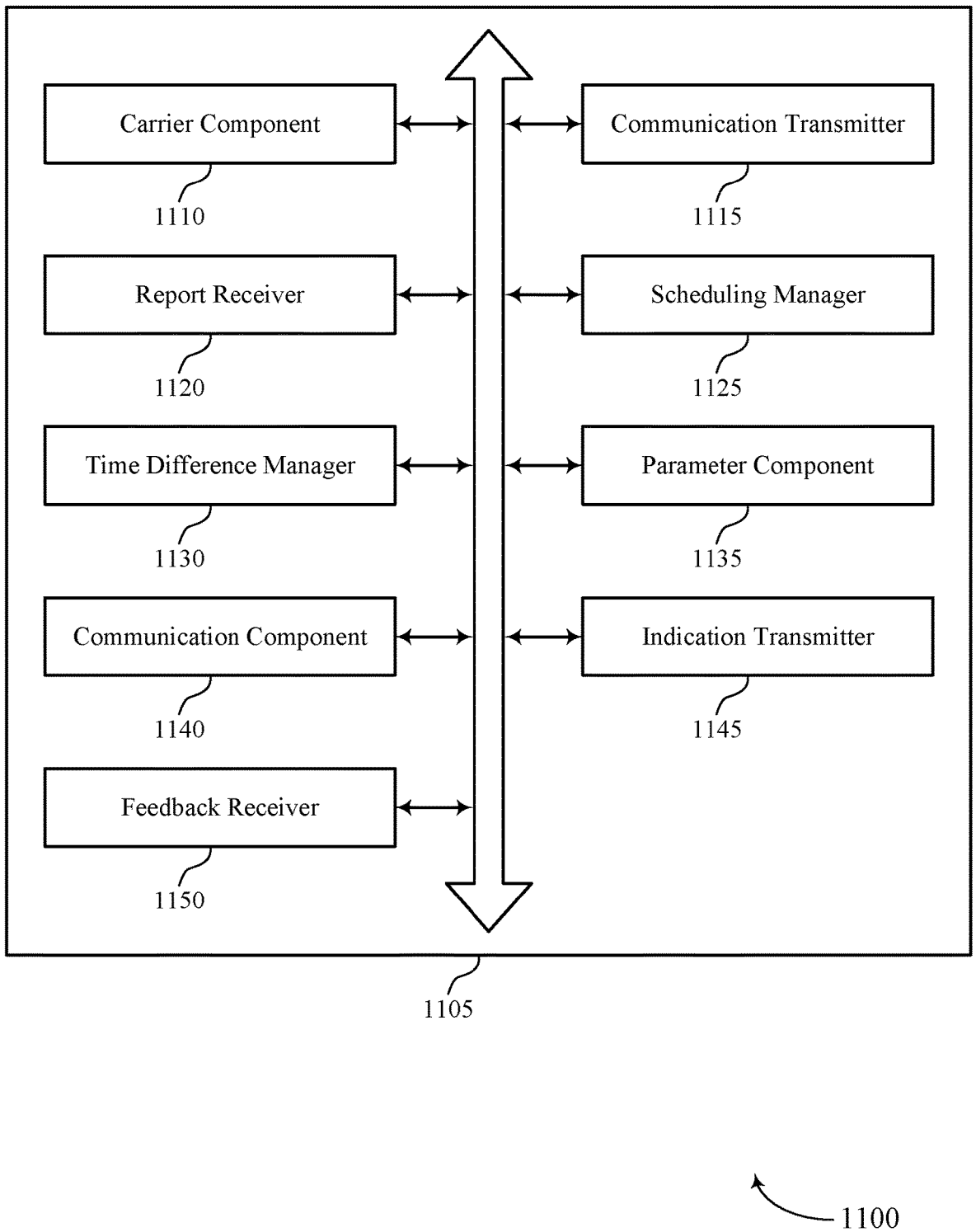
FIG. 11 shows a block diagram of a communications manager that supports throughput modification for time delayed carriers in accordance with aspects of the present disclosure.

FIG. 11 shows a block diagram 1100 of a communications manager 1105 that supports throughput modification for time delayed carriers in accordance with aspects of the present disclosure. The communications manager 1105 may be an example of aspects of a communications manager 915, a communications manager 1015, or a communications manager 1210 described herein. The communications manager 1105 may include a carrier component 1110, a communication transmitter 1115, a report receiver 1120, a scheduling manager 1125, a time difference manager 1130, a parameter component 1135, a communication component 1140, an indication transmitter 1145, and a feedback receiver 1150. Each of these modules may communicate, directly or indirectly, with one another (e.g., via one or more buses). One or more component carriers, referenced herein, may be include one or more carriers, channels, frequency ranges, subcarriers, etc.

The carrier component 1110 may identify a first component carrier configured for communications between a UE and a transmission reception point. The communication transmitter 1115 may transmit a first communication via the first component carrier to the UE. In some examples, the communication transmitter 1115 may retransmit the first communication to the UE based on the NACK feedback message. The report receiver 1120 may receive, from the UE, a report including an indication of a time difference between the first component carrier and a second component carrier configured for the UE.

The scheduling manager 1125 may schedule a subsequent communication for the UE based on the indication of the time difference and a time difference threshold. In some examples, the scheduling manager 1125 may schedule the subsequent communication based on determining that the time difference is below the time difference threshold. In some aspects, the scheduling manager 1125 may schedule the subsequent communication based on determining that the time difference exceeds the time difference threshold. In some cases, the time difference threshold includes an MRTD for the UE.

The time difference manager 1130 may determine that the time difference is below the time difference threshold based on the indication of the time difference. In some examples, the time difference manager 1130 may determine that the time difference exceeds the time difference threshold based on the indication of the time difference. The parameter component 1135 may adjust an MCS parameter for the subsequent communication. The communication component 1140 may communicate the subsequent communication with the UE according to the adjusted MCS parameter.

The indication transmitter 1145 may transmit an indication of the time difference threshold to the UE, the time difference threshold being associated with the UE or a set of component carriers associated with the UE. In some examples, transmitting the indication of the time difference threshold includes transmitting a RRC message that includes the indication of the time difference threshold. In some cases, the time difference threshold is a dynamic threshold, a semi-static threshold, or a static threshold associated with the UE or the set of component carriers.

The feedback receiver 1150 may receive a channel feedback report for the first component carrier from the UE, the channel feedback report based on a channel quality reporting limit of the UE. In some examples, the feedback receiver 1150 may receive a NACK feedback message in response to the first communication based on the time difference exceeding the time difference threshold. In some cases, the channel quality reporting limit includes an MCS limit, an RI limit, a number of receiver chains, or a combination thereof for the first component carrier.

Figure 12:
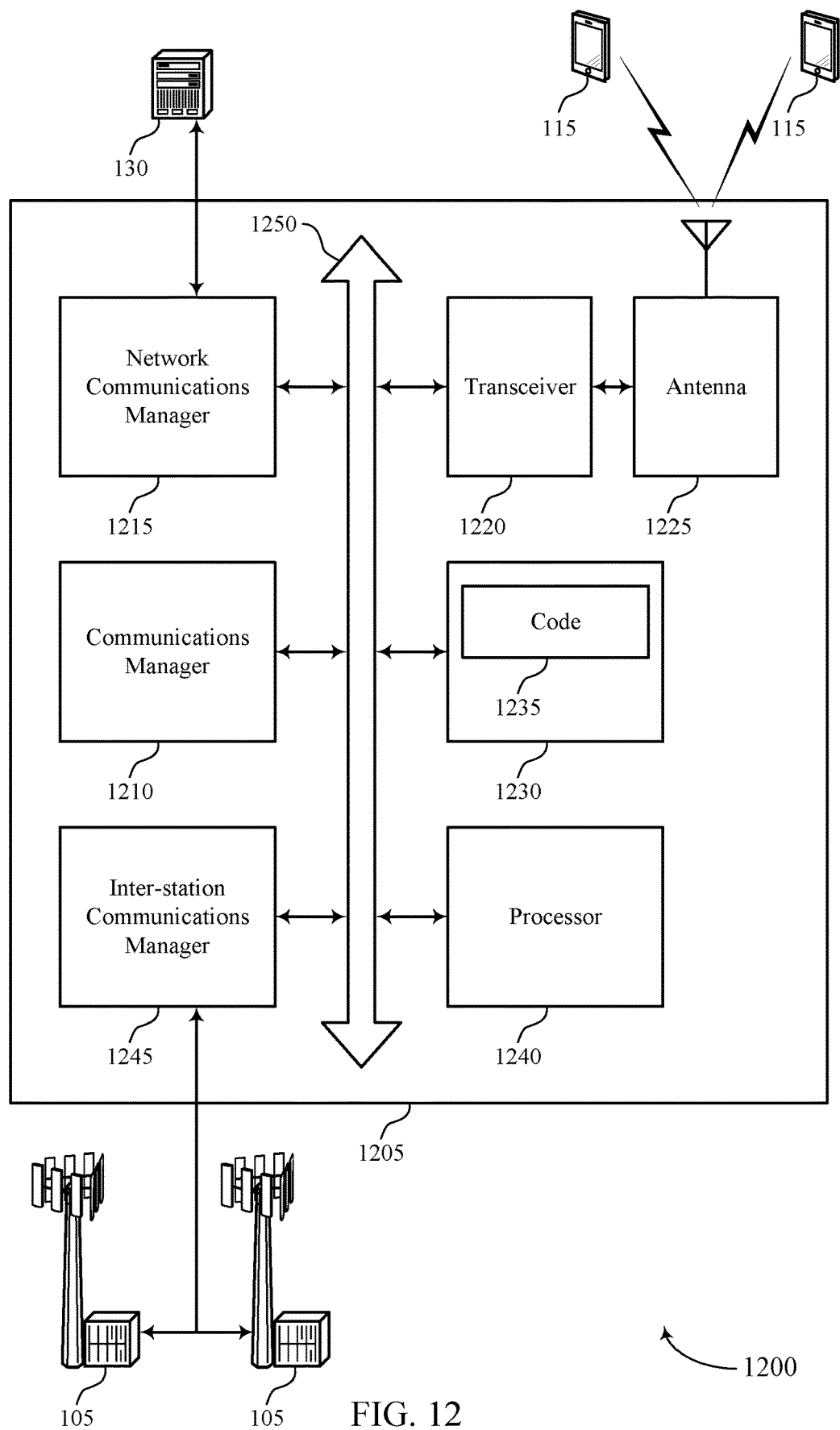
FIG. 12 shows a diagram of a system including a device that supports throughput modification for time delayed carriers in accordance with aspects of the present disclosure.

FIG. 12 shows a diagram of a system 1200 including a device 1205 that supports throughput modification for time delayed carriers in accordance with aspects of the present disclosure. The device 1205 may be an example of or include the components of device 905, device 1005, or a transmission reception point 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250). One or more component carriers, referenced herein, may be include one or more carriers, channels, frequency ranges, subcarriers, etc.

The communications manager 1210 may identify a first component carrier configured for communications between a UE and a transmission reception point, transmit a first communication via the first component carrier to the UE, receive, from the UE, a report including an indication of a time difference between the first component carrier and a second component carrier configured for the UE, and schedule a subsequent communication for the UE based on the indication of the time difference and a time difference threshold.

The network communications manager 1215 may manage communications with the core network (e.g., via one or more wired backhaul links). For example, the network communications manager 1215 may manage the transfer of data communications for client devices, such as one or more UEs 115. The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the device 1205 may include a single antenna 1225. In some examples, the device 1205 may have more than one antenna 1225, which may be capable of concurrently transmitting or receiving multiple wireless transmissions. The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting throughput modification for time delayed carriers).

The inter-station communications manager 1245 may manage communications with other transmission reception point 105, and may include a controller or scheduler for controlling communications with UEs 115 in cooperation with other transmission reception points 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between transmission reception points 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
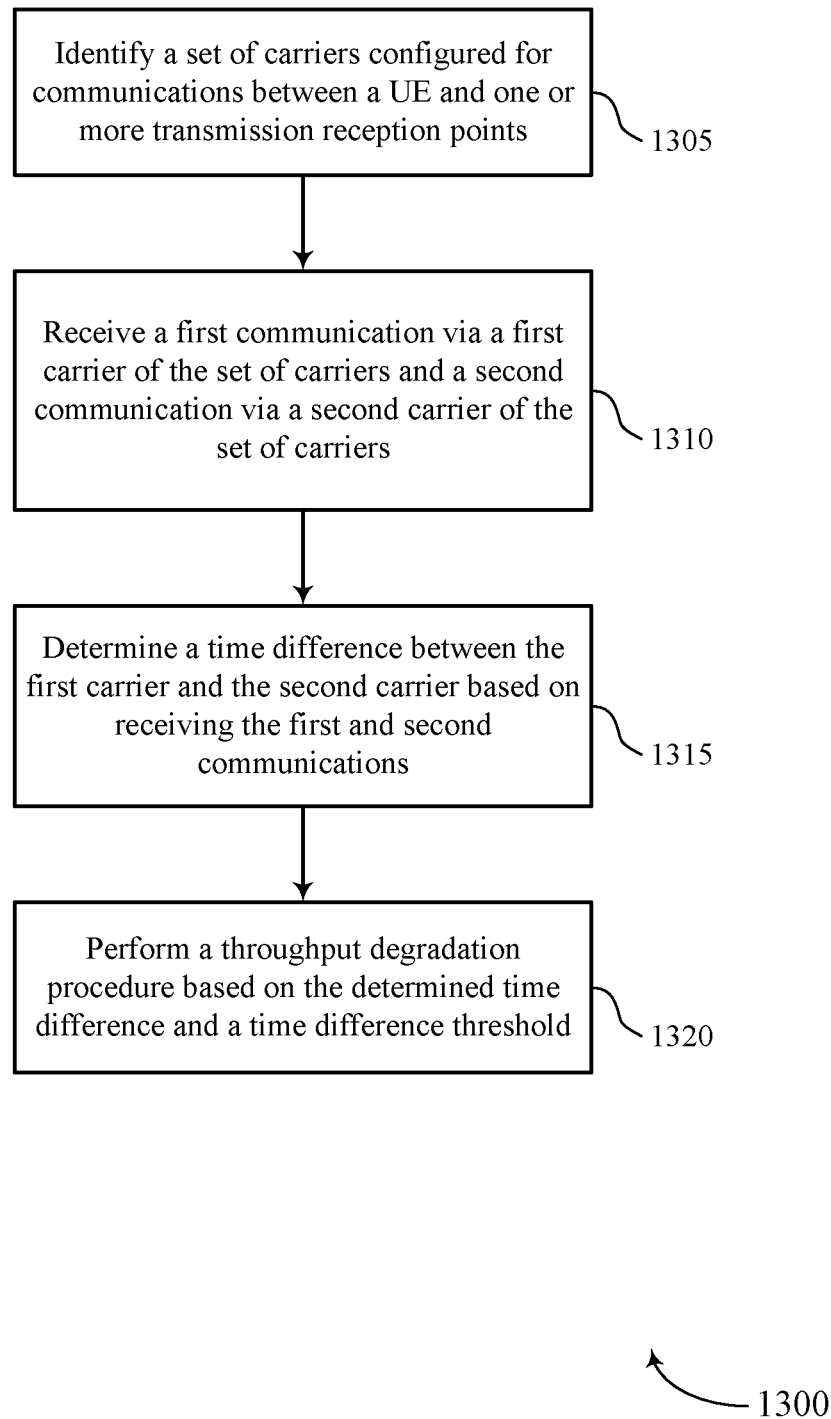
FIGS. 13 through 19 show flowcharts illustrating methods that support throughput modification for time delayed carriers in accordance with aspects of the present disclosure.

FIG. 13 shows a flowchart illustrating a method 1300 that supports throughput modification for time delayed carriers in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a set of component carriers (e.g., carriers, channels, frequency ranges, subcarriers) configured for communications between a UE and a set of transmission reception points. The operations of 1305 may be performed according to the methods described herein. In some examples, aspects of the operations of 1305 may be performed by a carrier component as described with reference to FIGS. 5 through 8. At 1310, the UE may receive a first communication via a first component carrier of the set of component carriers and a second communication via a second component carrier of the set of component carriers. The operations of 1310 may be performed according to the methods described herein. In some examples, aspects of the operations of 1310 may be performed by a communication receiver as described with reference to FIGS. 5 through 8.

At 1315, the UE may determine a time difference between the first component carrier and the second component carrier based on receiving the first and second communications. The operations of 1315 may be performed according to the methods described herein. In some examples, aspects of the operations of 1315 may be performed by a time difference manager as described with reference to FIGS. 5 through 8. At 1320, the UE may perform a throughput degradation procedure based on the determined time difference and a time difference threshold. The operations of 1320 may be performed according to the methods described herein. In some examples, aspects of the operations of 1320 may be performed by a throughput component as described with reference to FIGS. 5 through 8.

Figure 14:
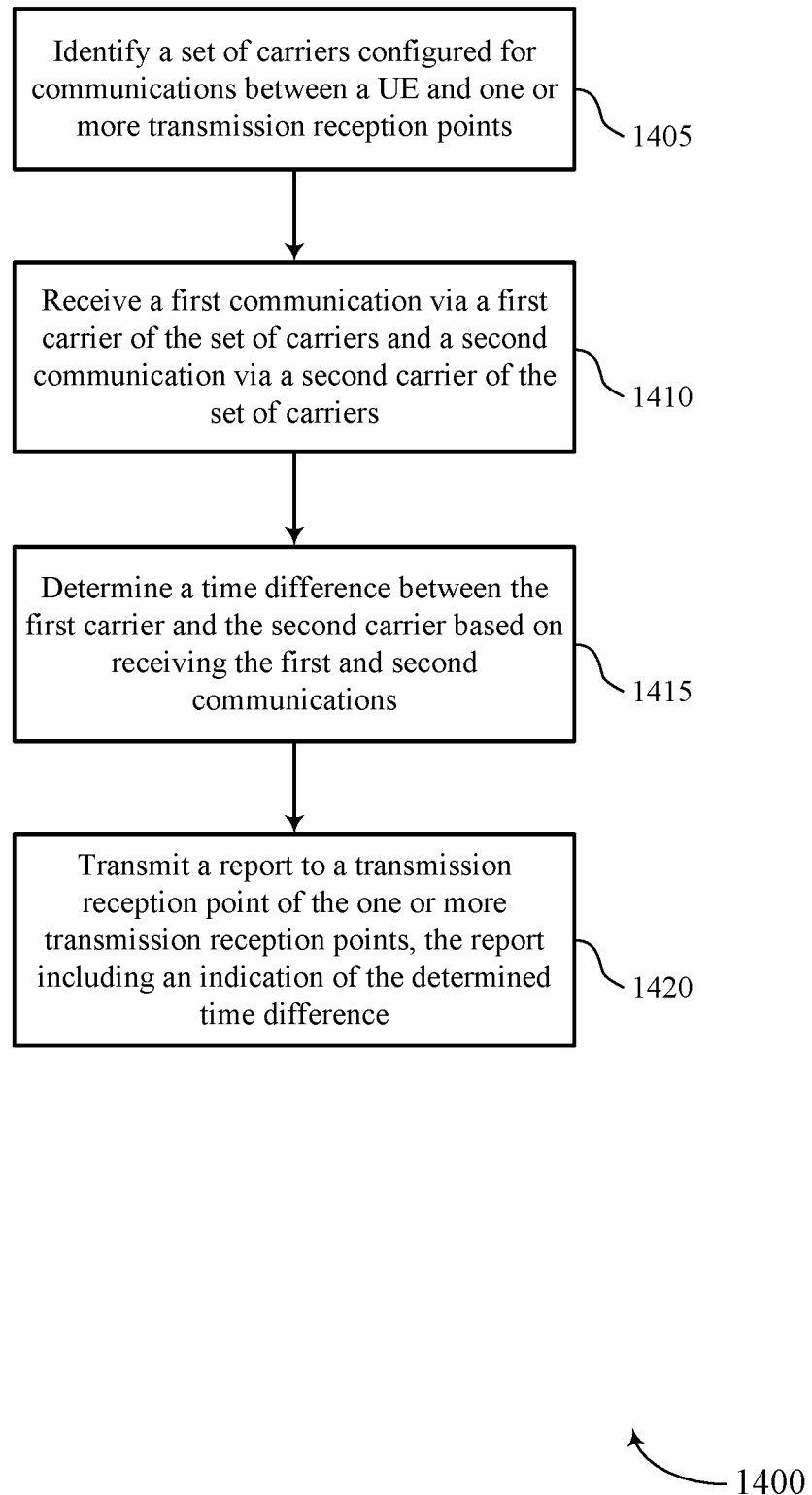

FIG. 14 shows a flowchart illustrating a method 1400 that supports throughput modification for time delayed carriers in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a set of component carriers (e.g., carriers, channels, frequency ranges, subcarriers) configured for communications between a UE and a set of transmission reception points. The operations of 1405 may be performed according to the methods described herein. In some examples, aspects of the operations of 1405 may be performed by a carrier component as described with reference to FIGS. 5 through 8. At 1410, the UE may receive a first communication via a first component carrier of the set of component carriers and a second communication via a second component carrier of the set of component carriers. The operations of 1410 may be performed according to the methods described herein. In some examples, aspects of the operations of 1410 may be performed by a communication receiver as described with reference to FIGS. 5 through 8.

At 1415, the UE may determine a time difference between the first component carrier and the second component carrier based on receiving the first and second communications. The operations of 1415 may be performed according to the methods described herein. In some examples, aspects of the operations of 1415 may be performed by a time difference manager as described with reference to FIGS. 5 through 8. At 1420, the UE may transmit a report to a transmission reception point of the set of transmission reception points, the report including an indication of the determined time difference. The operations of 1420 may be performed according to the methods described herein. In some examples, aspects of the operations of 1420 may be performed by a report transmitter as described with reference to FIGS. 5 through 8.

Figure 15:
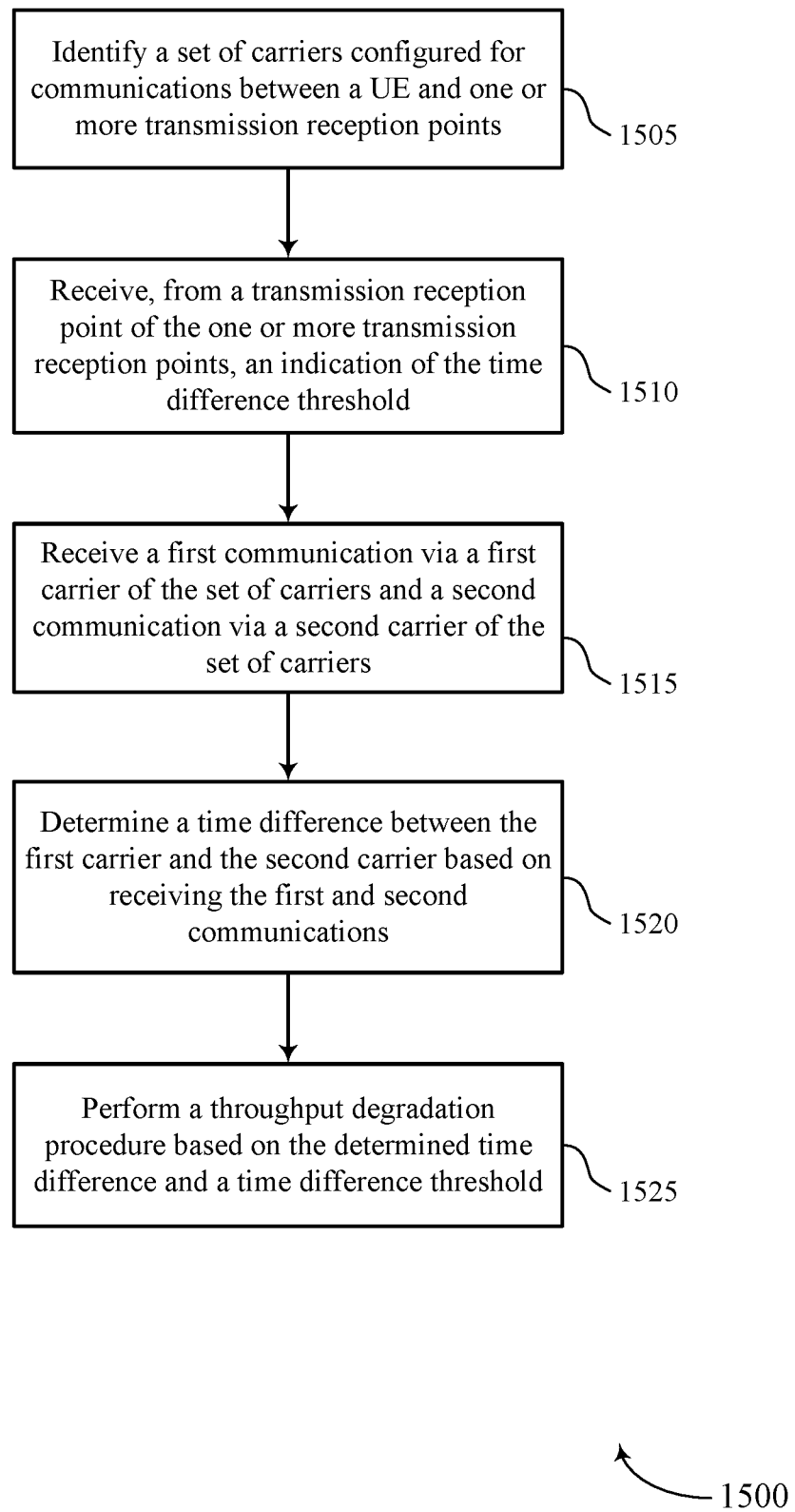

FIG. 15 shows a flowchart illustrating a method 1500 that supports throughput modification for time delayed carriers in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify a set of component carriers (e.g., carriers, channels, frequency ranges, subcarriers) configured for communications between a UE and a set of transmission reception points. The operations of 1505 may be performed according to the methods described herein. In some examples, aspects of the operations of 1505 may be performed by a carrier component as described with reference to FIGS. 5 through 8. At 1510, the UE may receive, from a transmission reception point of the set of transmission reception points, an indication of the time difference threshold. The operations of 1510 may be performed according to the methods described herein. In some examples, aspects of the operations of 1510 may be performed by a threshold receiver as described with reference to FIGS. 5 through 8.

At 1515, the UE may receive a first communication via a first component carrier of the set of component carriers and a second communication via a second component carrier of the set of component carriers. The operations of 1515 may be performed according to the methods described herein. In some examples, aspects of the operations of 1515 may be performed by a communication receiver as described with reference to FIGS. 5 through 8. At 1520, the UE may determine a time difference between the first component carrier and the second component carrier based on receiving the first and second communications. The operations of 1520 may be performed according to the methods described herein. In some examples, aspects of the operations of 1520 may be performed by a time difference manager as described with reference to FIGS. 5 through 8.

At 1525, the UE may perform a throughput degradation procedure based on the determined time difference and a time difference threshold. The operations of 1525 may be performed according to the methods described herein. In some examples, aspects of the operations of 1525 may be performed by a throughput component as described with reference to FIGS. 5 through 8.

Figure 16:
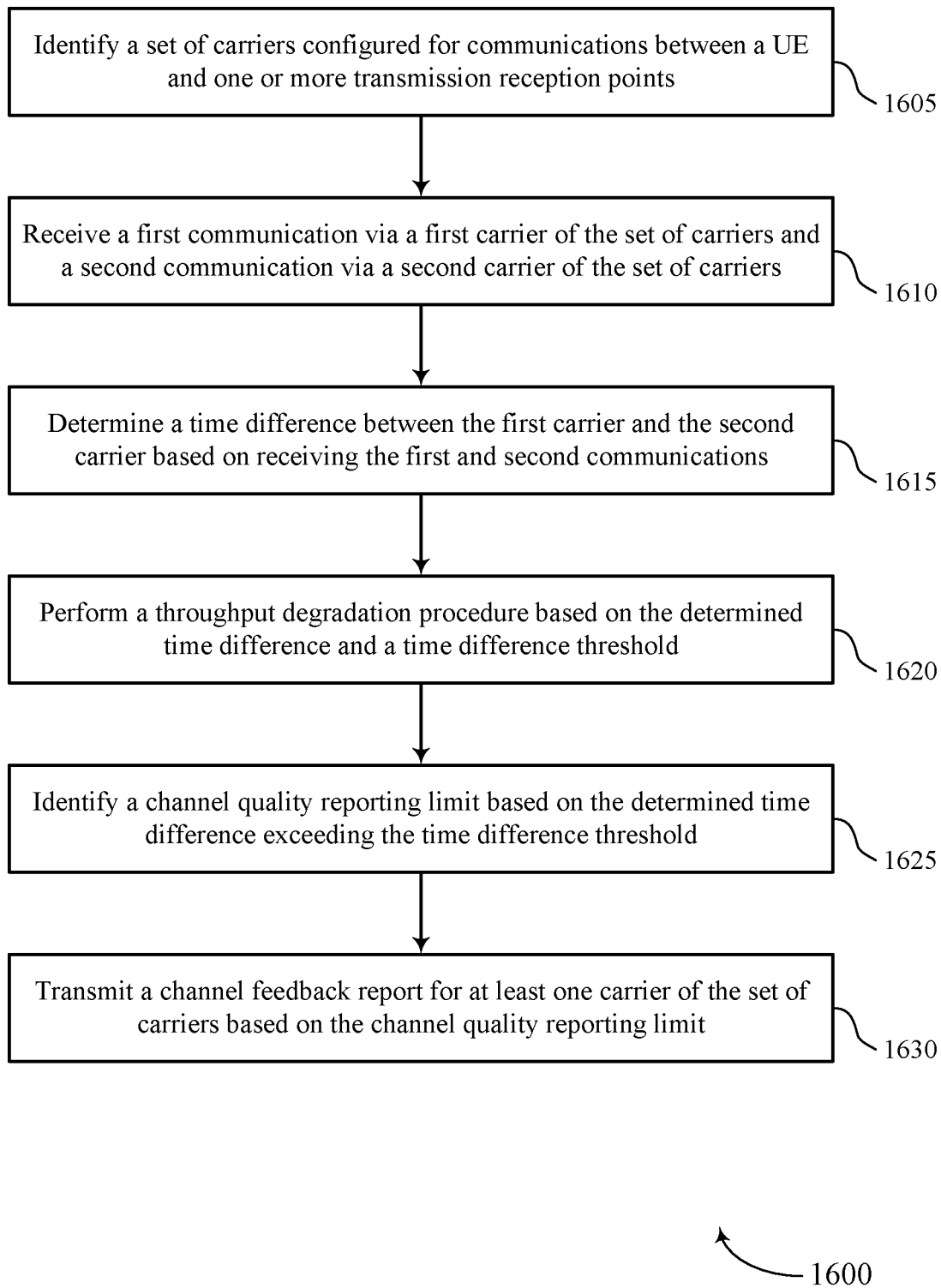

FIG. 16 shows a flowchart illustrating a method 1600 that supports throughput modification for time delayed carriers in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may identify a set of component carriers (e.g., carriers, channels, frequency ranges, subcarriers) configured for communications between a UE and a set of transmission reception points. The operations of 1605 may be performed according to the methods described herein. In some examples, aspects of the operations of 1605 may be performed by a carrier component as described with reference to FIGS. 5 through 8. At 1610, the UE may receive a first communication via a first component carrier of the set of component carriers and a second communication via a second component carrier of the set of component carriers. The operations of 1610 may be performed according to the methods described herein. In some examples, aspects of the operations of 1610 may be performed by a communication receiver as described with reference to FIGS. 5 through 8.

At 1615, the UE may determine a time difference between the first component carrier and the second component carrier based on receiving the first and second communications. The operations of 1615 may be performed according to the methods described herein. In some examples, aspects of the operations of 1615 may be performed by a time difference manager as described with reference to FIGS. 5 through 8. At 1620, the UE may perform a throughput degradation procedure based on the determined time difference and a time difference threshold. The operations of 1620 may be performed according to the methods described herein. In some examples, aspects of the operations of 1620 may be performed by a throughput component as described with reference to FIGS. 5 through 8.

At 1625, the UE may identify a channel quality reporting limit. In some examples, the channel quality reporting limit may be based on the determined time difference exceeding the time difference threshold. The operations of 1625 may be performed according to the methods described herein. In some examples, aspects of the operations of 1625 may be performed by a channel quality manager as described with reference to FIGS. 5 through 8. At 1630, the UE may transmit a channel feedback report for at least one component carrier of the set of component carriers based on the channel quality reporting limit. The operations of 1630 may be performed according to the methods described herein. In some examples, aspects of the operations of 1630 may be performed by a channel feedback component as described with reference to FIGS. 5 through 8.

Figure 17:
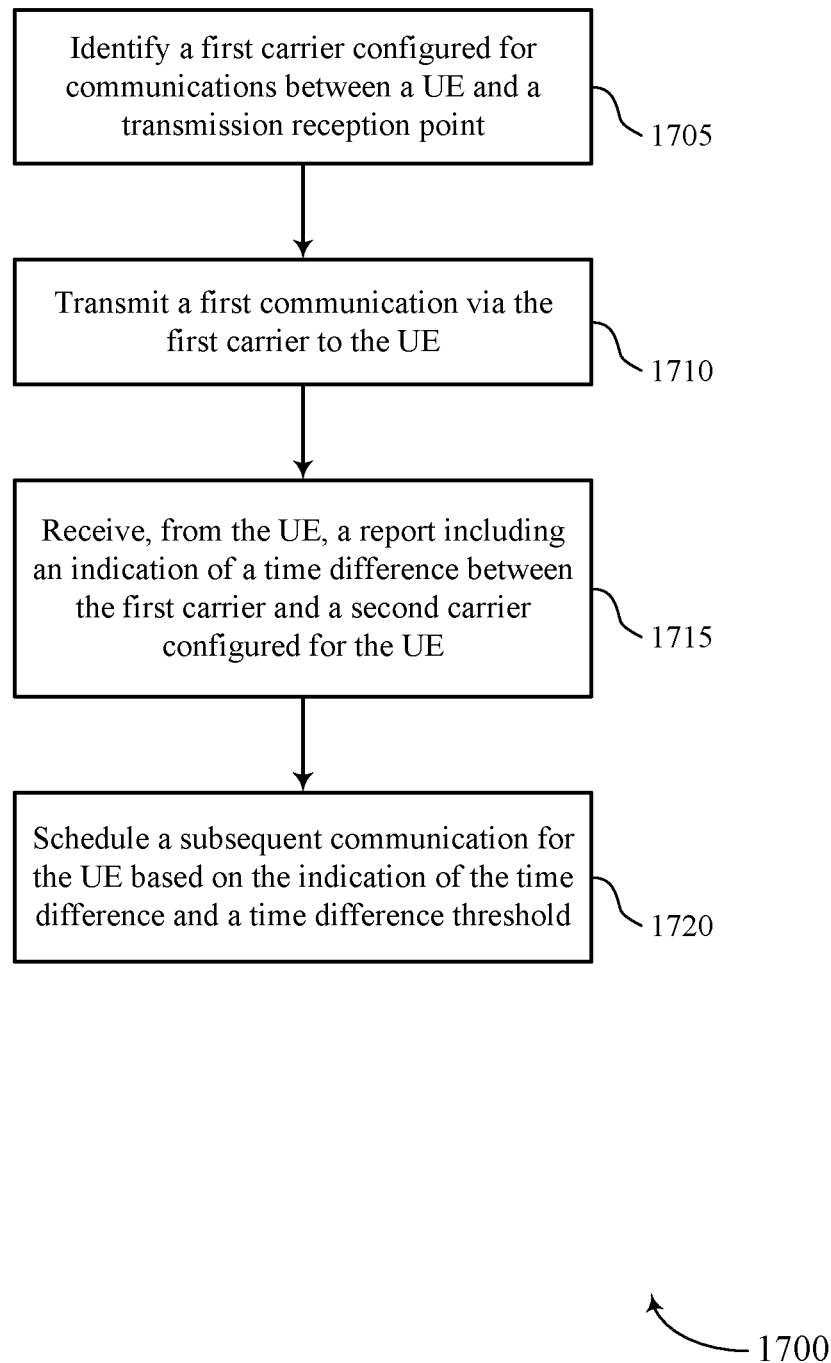

FIG. 17 shows a flowchart illustrating a method 1700 that supports throughput modification for time delayed carriers in accordance with aspects of the present disclosure. The operations of method 1700 may be implemented by a transmission reception point 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware. One or more component carriers, referenced herein, may be an example of other carriers (e.g., channels/frequency ranges/subcarriers). Additionally or alternatively, one or more sets of component carriers, referenced herein, may be an example of one or more sets which include other carriers (e.g., channels/frequency ranges/sub-carriers).

At 1705, the base station may identify a first component carrier configured for communications between a UE and a transmission reception point. The operations of 1705 may be performed according to the methods described herein. In some examples, aspects of the operations of 1705 may be performed by a carrier component as described with reference to FIGS. 9 through 12. At 1710, the base station may transmit a first communication via the first component carrier to the UE. The operations of 1710 may be performed according to the methods described herein. In some examples, aspects of the operations of 1710 may be performed by a communication transmitter as described with reference to FIGS. 9 through 12.

At 1715, the base station may receive, from the UE, a report including an indication of a time difference between the first component carrier and a second component carrier configured for the UE. The operations of 1715 may be performed according to the methods described herein. In some examples, aspects of the operations of 1715 may be performed by a report receiver as described with reference to FIGS. 9 through 12. At 1720, the base station may schedule a subsequent communication for the UE based on the indication of the time difference and a time difference threshold. The operations of 1720 may be performed according to the methods described herein. In some examples, aspects of the operations of 1720 may be performed by a scheduling manager as described with reference to FIGS. 9 through 12.

Figure 18:
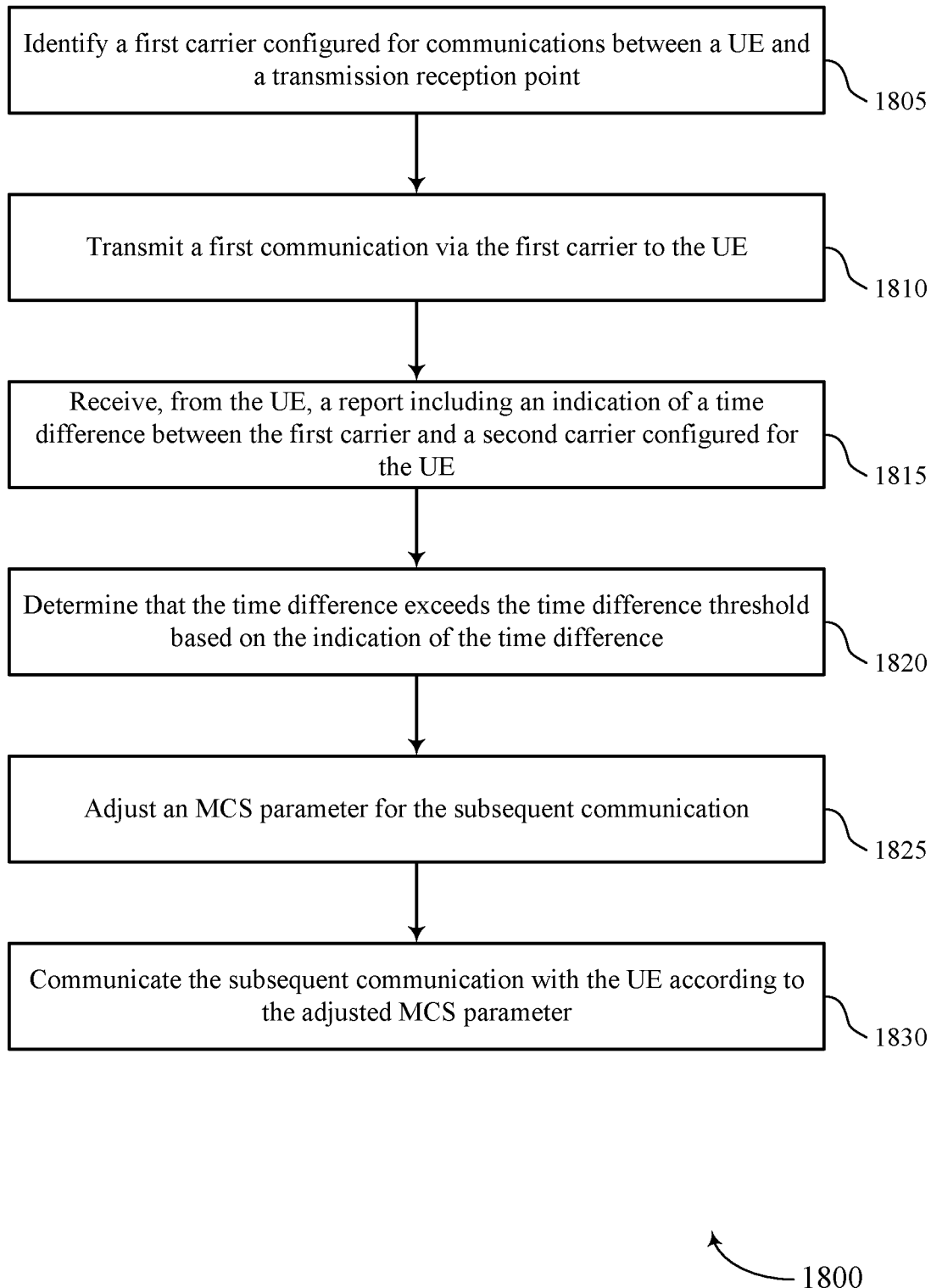

FIG. 18 shows a flowchart illustrating a method 1800 that supports throughput modification for time delayed carriers in accordance with aspects of the present disclosure. The operations of method 1800 may be implemented by a transmission reception point 105 or its components as described herein. For example, the operations of method 1800 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware. One or more component carriers, referenced herein, may be an example of one or more carriers, channels, frequency ranges, subcarriers, etc.

At 1805, the base station may identify a first component carrier configured for communications between a UE and a transmission reception point. The operations of 1805 may be performed according to the methods described herein. In some examples, aspects of the operations of 1805 may be performed by a carrier component as described with reference to FIGS. 9 through 12. At 1810, the base station may transmit a first communication via the first component carrier to the UE. The operations of 1810 may be performed according to the methods described herein. In some examples, aspects of the operations of 1810 may be performed by a communication transmitter as described with reference to FIGS. 9 through 12.

At 1815, the base station may receive, from the UE, a report including an indication of a time difference between the first component carrier and a second component carrier configured for the UE. The operations of 1815 may be performed according to the methods described herein. In some examples, aspects of the operations of 1815 may be performed by a report receiver as described with reference to FIGS. 9 through 12. At 1820, the base station may determine that the time difference exceeds the time difference threshold based on the indication of the time difference. The operations of 1820 may be performed according to the methods described herein. In some examples, aspects of the operations of 1820 may be performed by a time difference manager as described with reference to FIGS. 9 through 12.

At 1825, the base station may adjust an MCS parameter for the subsequent communication. The operations of 1825 may be performed according to the methods described herein. In some examples, aspects of the operations of 1825 may be performed by a parameter component as described with reference to FIGS. 9 through 12. At 1830, the base station may communicate the subsequent communication with the UE according to the adjusted MCS parameter. The operations of 1830 may be performed according to the methods described herein. In some examples, aspects of the operations of 1830 may be performed by a communication component as described with reference to FIGS. 9 through 12.

Figure 19:
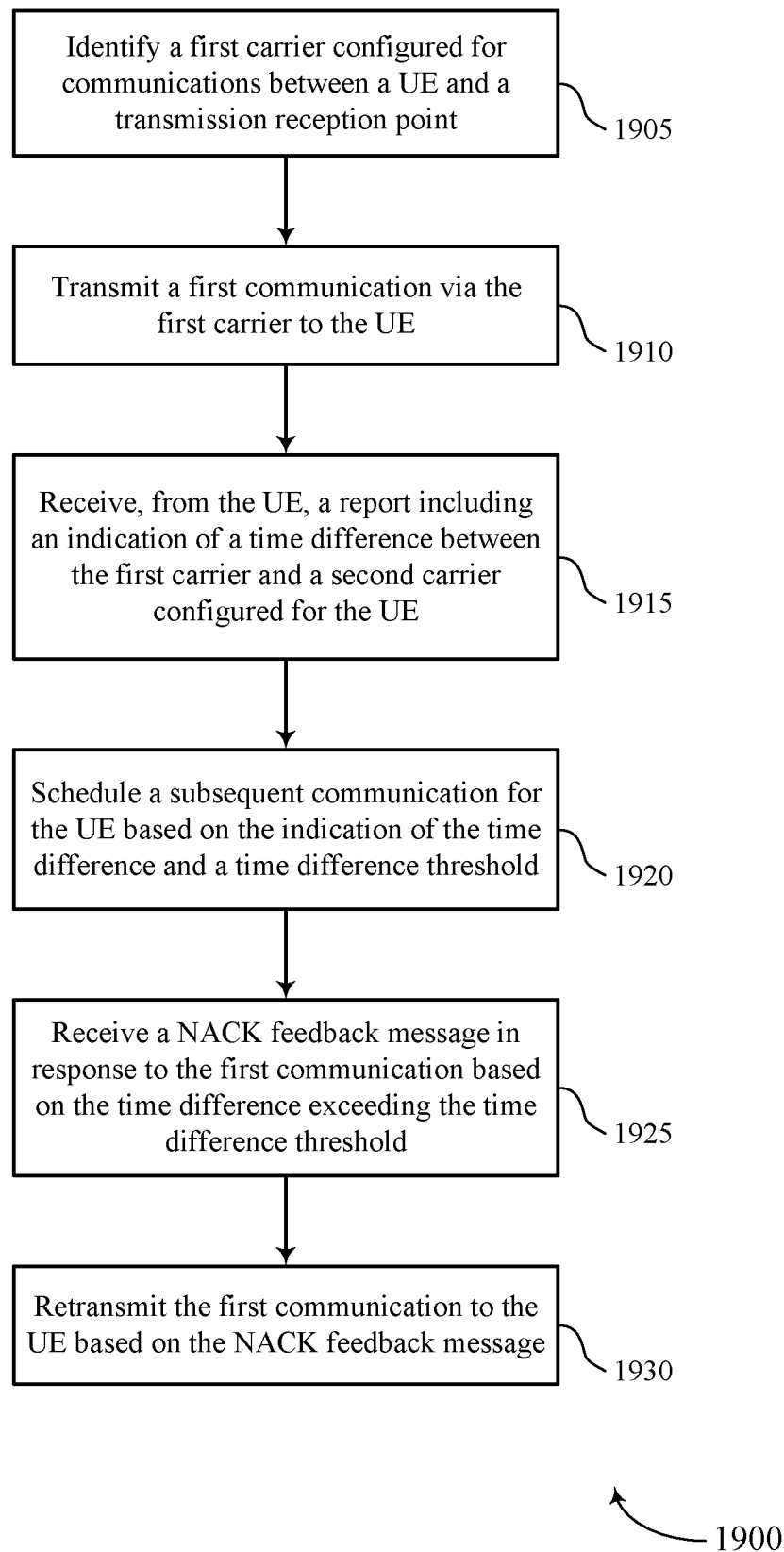

FIG. 19 shows a flowchart illustrating a method 1900 that supports throughput modification for time delayed carriers in accordance with aspects of the present disclosure. The operations of method 1900 may be implemented by a transmission reception point 105 or its components as described herein. For example, the operations of method 1900 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware. One or more component carriers, referenced herein, may be an example of one or more carriers, channels, frequency ranges, subcarriers, etc.

At 1905, the base station may identify a first component carrier configured for communications between a UE and a transmission reception point. The operations of 1905 may be performed according to the methods described herein. In some examples, aspects of the operations of 1905 may be performed by a carrier component as described with reference to FIGS. 9 through 12. At 1910, the base station may transmit a first communication via the first component carrier to the UE. The operations of 1910 may be performed according to the methods described herein. In some examples, aspects of the operations of 1910 may be performed by a communication transmitter as described with reference to FIGS. 9 through 12.

At 1915, the base station may receive, from the UE, a report including an indication of a time difference between the first component carrier and a second component carrier configured for the UE. The operations of 1915 may be performed according to the methods described herein. In some examples, aspects of the operations of 1915 may be performed by a report receiver as described with reference to FIGS. 9 through 12. At 1920, the base station may schedule a subsequent communication for the UE based on the indication of the time difference and a time difference threshold. The operations of 1920 may be performed according to the methods described herein. In some examples, aspects of the operations of 1920 may be performed by a scheduling manager as described with reference to FIGS. 9 through 12.

At 1925, the base station may receive a NACK feedback message in response to the first communication based on the time difference exceeding the time difference threshold. The operations of 1925 may be performed according to the methods described herein. In some examples, aspects of the operations of 1925 may be performed by a feedback receiver as described with reference to FIGS. 9 through 12. At 1930, the base station may retransmit the first communication to the UE based on the NACK feedback message. The operations of 1930 may be performed according to the methods described herein. In some examples, aspects of the operations of 1930 may be performed by a communication transmitter as described with reference to FIGS. 9 through 12. It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a set of carriers configured for communications between the UE and one or more transmission reception points, the set of carriers associated with a carrier aggregation (CA) scheme, wherein the set of carriers comprises a first carrier and a second carrier for combining communications according to the CA scheme;
   receiving a first communication via the first carrier of the set of carriers and a second communication via the second carrier of the set of carriers;
   determining a time difference between the first carrier and the second carrier based at least in part on receiving the first and second communications; and
   performing a throughput degradation procedure based at least in part on the determined time difference and a time difference threshold, wherein performing the throughput degradation procedure comprises identifying a channel quality reporting limit and transmitting a channel feedback report for at least one carrier of the set of carriers based at least in part on the channel quality reporting limit.

2. The method of claim 1, wherein performing the throughput degradation procedure comprises:
   transmitting a report to a transmission reception point of the one or more transmission reception points, the report comprising an indication of the determined time difference.

3. The method of claim 2, further comprising:
   determining that the time difference is below the time difference threshold, wherein the report indicates that the time difference is below the time difference threshold.

4. The method of claim 2, further comprising:
   determining that the time difference exceeds the time difference threshold, wherein the report indicates that the time difference exceeds the time difference threshold.

5. The method of claim 2, wherein the indication comprises a 1 bit indicator.

6. The method of claim 1, further comprising:
   receiving, from a transmission reception point of the one or more transmission reception points, an indication of the time difference threshold.

7. The method of claim 6, wherein receiving the indication of the time difference threshold comprises:
   receiving a radio resource control (RRC) message that comprises the indication of the time difference threshold.

8. The method of claim 1, wherein the channel quality reporting limit comprises a modulation coding scheme (MCS) limit, a rank indicator (RI) limit, a number of receiver chains, or a combination thereof for the at least one carrier.

9. The method of claim 1, wherein the channel feedback report comprises an indication of channel quality for a subset of the set of carriers.

10. The method of claim 9, further comprising:
    selecting the subset of the set of carriers for the indication of channel quality based at least in part on a signal to noise ratio (SNR) or a time delay associated with each carrier in the subset.

11. The method of claim 1, wherein performing the throughput degradation procedure comprises:
    transmitting, based at least in part on the determined time difference exceeding the time difference threshold, a negative acknowledgement (NACK) feedback message without processing a grant on at least one carrier of the set of carriers, or in response to a successful decoding of a communication on the at least one carrier of the set of carriers.

12. The method of claim 1, further comprising:
    dropping at least one of the first communication or the second communication based at least in part on the determined time difference exceeding the time difference threshold.

13. A method for wireless communications at a transmission reception point, comprising:
    identifying a first carrier of a set of carriers configured for communications between a user equipment (UE) and the transmission reception point, the set of carriers associated with a carrier aggregation (CA) scheme, wherein the set of carriers comprises the first carrier and a second carrier for combining communications according to the CA scheme;
transmitting a first communication via the first carrier to the UE;
receiving, from the UE, a report comprising an indication of a time difference between the first carrier and the second carrier of the set of carriers configured for the UE;
determining that the time difference exceeds a time difference threshold based at least in part on the indication of the time difference; and
scheduling a subsequent communication for the UE based at least in part on the indication of the time difference, the time difference threshold, and determining that the time difference exceeds the time difference threshold, wherein scheduling the subsequent communication comprises adjusting a modulation coding scheme (MCS) parameter for the subsequent communication, and communicating the subsequent communication with the UE according to the adjusted MCS parameter.

14. The method of claim 13, further comprising:
determining that the time difference is below the time difference threshold based at least in part on the indication of the time difference; and
scheduling the subsequent communication based at least in part on determining that the time difference is below the time difference threshold.

15. The method of claim 13, further comprising:
transmitting an indication of the time difference threshold to the UE, the time difference threshold being associated with the UE or the set of carriers associated with the UE.

16. The method of claim 15, wherein transmitting the indication of the time difference threshold comprises:
transmitting a radio resource control (RRC) message that comprises the indication of the time difference threshold.

17. The method of claim 13, further comprising:
receiving a channel feedback report for the first carrier from the UE, the channel feedback report based at least in part on a channel quality reporting limit of the UE.

18. The method of claim 17, wherein the channel quality reporting limit comprises a modulation coding scheme (MCS) limit, a rank indicator (RI) limit, a number of receiver chains, or a combination thereof for the first carrier.

19. The method of claim 13, further comprising:
receiving a negative acknowledgement (NACK) feedback message in response to the first communication based at least in part on the time difference exceeding the time difference threshold; and
retransmitting the first communication to the UE based at least in part on the NACK feedback message.

20. An apparatus for wireless communications, comprising:
a processor, a transmitter, a receiver, and memory coupled with the processor; and
instructions stored in the memory and executable by the processor to cause the apparatus to:
identify a set of carriers configured for communications between a user equipment (UE) and one or more transmission reception points, the set of carriers associated with a carrier aggregation (CA) scheme, wherein the set of carriers comprises a first carrier and a second carrier for combining communications according to the CA scheme;
receive, by the receiver, a first communication via the first carrier of the set of carriers and a second communication via the second carrier of the set of carriers;
determine a time difference between the first carrier and the second carrier based at least in part on receiving the first and second communications; and
perform a throughput degradation procedure based at least in part on the determined time difference and a time difference threshold, wherein performing the throughput degradation procedure comprises transmitting, based at least in part on the determined time difference exceeding the time difference threshold, a negative acknowledgement (NACK) feedback message without processing a grant on at least one carrier of the set of carriers, or in response to a successful decoding of a communication on the at least one carrier of the set of carriers.

21. The apparatus of claim 20, wherein the instructions to perform the throughput degradation procedure are executable by the processor to cause the apparatus to:
transmit, by the transmitter, a report to a transmission reception point of the one or more transmission reception points, the report comprising an indication of the determined time difference.

22. The apparatus of claim 21, wherein the instructions are further executable by the processor to cause the apparatus to:
determine that the time difference is below the time difference threshold, wherein the report indicates that the time difference is below the time difference threshold.

23. The apparatus of claim 21, wherein the instructions are further executable by the processor to cause the apparatus to:
determine that the time difference exceeds the time difference threshold, wherein the report indicates that the time difference exceeds the time difference threshold.

24. An apparatus for wireless communications, comprising:
a processor, a transmitter, a receiver, and memory coupled with the processor; and
instructions stored in the memory and executable by the processor to cause the apparatus to:
identify a first carrier of a set of carriers configured for communications between a user equipment (UE) and a transmission reception point, the set of carriers associated with a carrier aggregation (CA) scheme, wherein the set of carriers comprises the first carrier and a second carrier for combining communications according to the CA scheme;
transmit, by the transmitter, a first communication via the first carrier to the UE;
receive, by the receiver and from the TIE, a report comprising an indication of a time difference between the first carrier and the second carrier configured for the UE;
receive a channel feedback report for the first carrier from the UE, the channel feedback report based at least in part on a channel quality reporting limit of the UE, wherein the channel quality reporting limit comprises a modulation coding scheme (MCS) limit, a rank indicator (RI) limit, a number of receiver chains, or a combination thereof for the first carrier; and schedule a subsequent communication for the UE based at least in part on the indication of the time difference and a time difference threshold.

25. The apparatus of claim 24, wherein the instructions are further executable by the processor to cause the apparatus to:
   determine that the time difference is below the time difference threshold based at least in part on the indication of the time difference; and
   schedule the subsequent communication based at least in part on determining that the time difference is below the time difference threshold.

26. The apparatus of claim 24, wherein the instructions are further executable by the processor to cause the apparatus to:
   determine that the time difference exceeds the time difference threshold based at least in part on the indication of the time difference; and
   schedule the subsequent communication based at least in part on determining that the time difference exceeds the time difference threshold.

27. The apparatus of claim 26, wherein the instructions to schedule the subsequent communication are executable by the processor to cause the apparatus to:
   adjust a modulation coding scheme (MCS) parameter for the subsequent communication; and
   communicate the subsequent communication with the UE according to the adjusted MCS parameter.

* * * * *